(12) United States Patent
Faour

(10) Patent No.: US 6,809,288 B2
(45) Date of Patent: Oct. 26, 2004

(54) LASER DRILLING SYSTEM AND METHOD

(75) Inventor: Joaquina Faour, Buenos Aires (AR)

(73) Assignee: Osmotica Corp., Road Town (VG)

( * ) Notice: Subject to any disclaimer, the term of this patent is extended or adjusted under 35 U.S.C. 154(b) by 57 days.

(21) Appl. No.: 10/153,226

(22) Filed: May 21, 2002

(65) Prior Publication Data

US 2003/0189030 A1 Oct. 9, 2003

Related U.S. Application Data

(60) Provisional application No. 60/293,151, filed on May 23, 2001.

(51) Int. Cl.[7] ............................................ B23K 26/38
(52) U.S. Cl. .............................. 219/121.7; 219/121.71; 219/121.82
(58) Field of Search ......................... 219/121.7, 121.71, 219/121.82, 121.67, 121.68, 121.69, 121.72

(56) References Cited

U.S. PATENT DOCUMENTS

| | | | |
|---|---|---|---|
| 4,088,864 A | | 5/1978 | Theeuwes et al. |
| 4,906,813 A | | 3/1990 | Gajdos |
| 4,952,789 A | * | 8/1990 | Suttie ..................... 219/121.68 |
| 5,085,510 A | | 2/1992 | Mitchell ..................... 356/237 |
| 5,117,087 A | | 5/1992 | Baker et al. |
| 5,256,440 A | | 10/1993 | Appel et al. |
| 5,294,770 A | | 3/1994 | Riddle et al. |
| 5,315,108 A | * | 5/1994 | Gross ..................... 250/223 B |
| 5,376,771 A | | 12/1994 | Roy |
| 5,399,828 A | | 3/1995 | Riddle et al. |
| 5,653,900 A | | 8/1997 | Clement et al. |
| 5,658,474 A | | 8/1997 | Geerke |
| 5,698,119 A | | 12/1997 | Geerke |
| 5,718,700 A | | 2/1998 | Edgren et al. |
| 5,783,793 A | | 7/1998 | Emerton et al. |
| 6,279,732 B1 | * | 8/2001 | Thompson .................. 198/799 |
| 6,350,962 B1 | * | 2/2002 | Beltrandi ............... 219/121.68 |

* cited by examiner

*Primary Examiner*—Samuel M. Heinrich
(74) *Attorney, Agent, or Firm*—Rick Matos; Innovar, L.L.C.

(57) ABSTRACT

The present invention provides a laser drilling system for drilling holes or cavities in a solid, in particular a solid dosage form. The system includes a loading zone, firing zone, inspection zone and delivery zone. The system also includes optional components such as a process validation system, solids detector, color detector, solids rejection/repositioning means, accepted products receptacle, rejected products receptacle and/or solids inspection system. Operation of the laser device in the firing zone and of other optional equipment is synchronized with movement of a continuous solids indexer by way of an electronic synchronizer. A solids handling system includes an optional fill level detector that directly or indirectly controls solids loading means that fills a solids reservoir. The system can be run continuously, semicontinuously or batchwise. A solids rejection system in the system provides for reduced solids loss as compared to other laser drilling systems and solids recovery rates of 100% can be achieved.

37 Claims, 15 Drawing Sheets

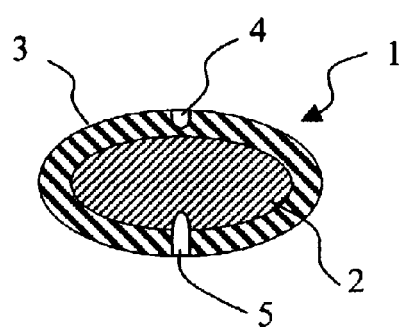
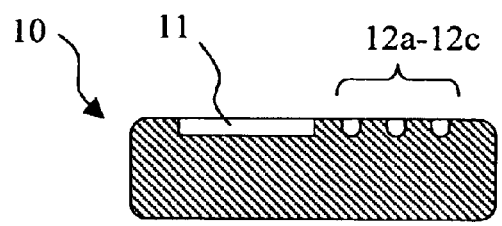
FIG. 1a  FIG. 1b
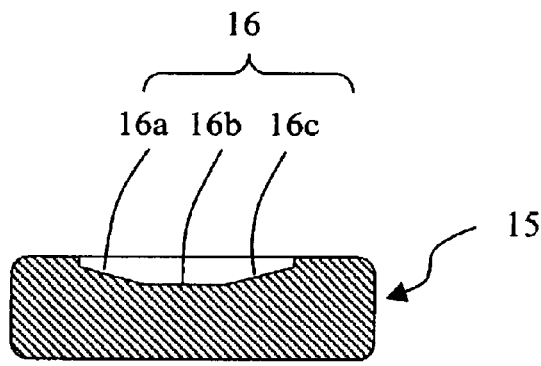
FIG. 1c

FIG. 13a
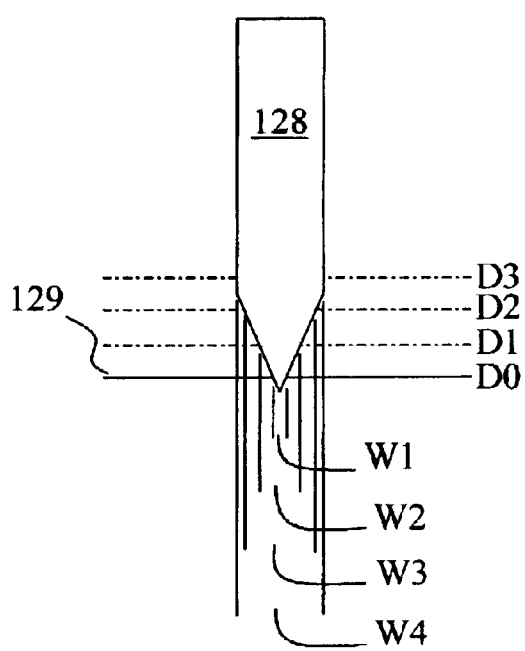
FIG. 13b
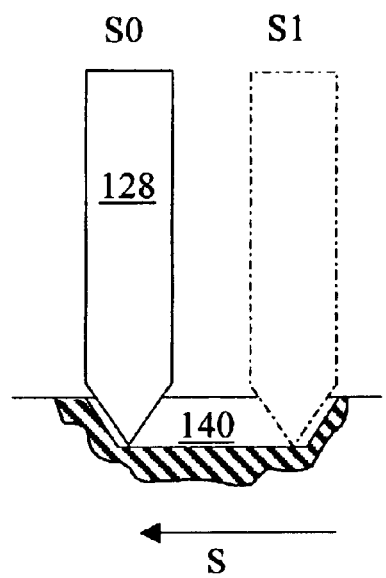
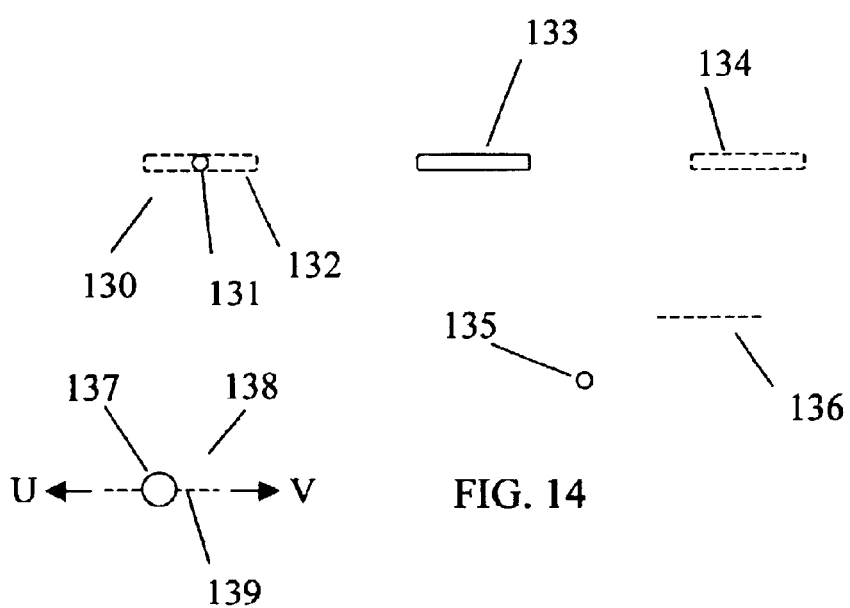
FIG. 14

LASER DRILLING SYSTEM AND METHOD

CROSS-REFERENCE TO EARLIER FILED APPLICATION

The present application claims the benefit of earlier filed provisional application for patent Ser. No. 60/293,151 filed May 23, 2001.

FIELD OF THE INVENTION

This invention pertains to a method of and apparatus for forming cavities on solid formulations. More particularly, it pertains to a method of and apparatus for forming one or more cavities or holes on the surface of a solid formulation, such as a solid pharmaceutical dosage form, by employing a laser device.

BACKGROUND OF THE INVENTION

Solid formulations are used for the delivery of active agents to an environment of use. Active agents generally include medicines, nutrients, food products, pesticides, herbicides, germicides, algaecides, chemical reagents, and others known to those of ordinary skill. When a solid formulation includes a core coated with a composition that is partially or completely insoluble in an intended environment of use, its coat(s) may include one or more perforations to permit release of the active agent from the core. Exemplary devices include osmotic devices, coated tablets, coated capsules, coated pills, coated lozenges, coated pellets, coated pastille and others. Some of these exemplary dosage forms employ osmotic pressure to control the release of the active agent contained in the core of the dosage form. These dosage forms may also include one or more layers, external to the core, comprising one or more materials that are subject to erosion or that slowly dissolve in the environment of use thereby gradually dispensing the active agent.

U.S. Pat. No. 4,088,864 to Theeuwes et al. and U.S. Pat. No. 4,063,064 to Saunders et al. disclose a high speed process for forming outlet passageways in the walls of osmotic devices for release of the contents of the osmotic device comprising: a) moving the pills in succession along a predetermined path at a predetermined velocity; b) tracking the moving pills seriatim at said velocity with a laser of a wavelength which is absorbable by said walls by oscillating the optical path of the laser back and forth over a predetermined section of the pill path at said velocity; c) firing the laser during said tracking; d) adjusting the laser beam dimension at said wall, the laser power and the firing duration being such that the laser beam is capable of piercing the wall; and e) forming, with the laser beam, an outlet passageway 4 to 2000 microns in diameter in the wall. These patents also disclose an apparatus for forming outlet passageways in the walls of osmotic devices for release of the contents of the osmotic device comprising: a) a support frame; b) a laser operating in a pulse mode; c) a laser-based optical pill-tracking mechanism; d) a rotary pill indexer; and e) an electrical power supply to supply and control power for the laser, the tracking mechanism, and the indexer.

U.S. Pat. No. 5,783,793 to Emerton et al. discloses a laser apparatus used to drill multiple holes on each side of a tablet sequentially without having to move the tablet. The apparatus includes mirrors and an acousto-optic deflector to reflect and deflect laser beam, respectively. The apparatus also includes an encoder coupled to the rotating shaft of a motor that rotates a tablet feeder. The encoder provides output signals that are used to regulate the timing of beam pulses so that the occurrence of beam pulses relative to tablet position, and hence the pattern generated, is synchronized.

U.S. Pat. No. 5,376,771 to Roy discloses a laser apparatus capable of simultaneously forming a plurality of holes on the semipermeable membrane of an osmotic device. The apparatus, marketed as the DIGIMARK™ system, includes a linear array of individual laser tubes directed at a tablet surface. The different laser tubes can be pulsed independently of one another to created an array of circular or slotted apertures on the surface of the tablet.

U.S. Pat. Nos. 5,658,474 and 5,698,119 to Geerke et al. disclose a single beam laser apparatus for drilling holes into a single side of a tablet. The apparatus employs a laser beam diverting system, which is a series of mirrors, to determine the presence of a tablet in the tablet slot of a tablet feeder prior to entry of the tablet into the firing zone of the apparatus. If a tablet is detected in the tablet slot, the laser fires a pulse into the respective slot as it passes through the firing zone. The beam can be pulsed or continuous and more than one hole can be drilled into the same side of a tablet. The hole can be a continuous channel, a single hole or a series of overlapping holes. The hole can be shaped as a slot, polygon or circle.

U.S. Pat. No. 4,806,728 to Salzer et al. discloses a laser apparatus for perforating the surface of solid dosage forms. The apparatus creates a laser beam that has an adjustable spot size at different locations while maintaining a constant path length for the beam. This apparatus requires a beam focusing means, beam shaping means and a dichroic mirror for reflecting the beam. The beam is programmable and is used to produce a pattern on the surface of a solid dosage form.

U.S. Pat. No. 4,903,813 to Gajdos discloses a laser apparatus for applying markings or break-notches on tablet surfaces. The laser operation of the apparatus is synchronized with the operation of a tablet press. The apparatus includes a mirror that deflects the laser beam through a mask to create the marking or break-notch on the tablet surface. The laser is intensity modulated and it can be made telescopic or swiveling so that the laser can mark the top or side surface of the tablet.

U.S. Pat. Nos. 5,399,828 and 5,294,770 disclose a laser apparatus that fires multiple pulses at a single site of a tablet as it passes under a laser beam. The laser is synchronized with movement of a tablet conveyor. The apparatus includes a controller responsive to movement of the conveyor and to operation of laser. A laser pulse only occurs when a "laser-ready" window in time coincides with a "tablet-ready" window in time. The apparatus can drill the top or bottom side of tablet. The laser beam is stationary and does not track the movement of the tablets. The apparatus can include a "side" detector to detect which side of tablet should be drilled. The apparatus can also include a pyroelectric detector off of the beam path to detect misfire of the beam and reject undrilled tablets. As with other systems, the apparatus can drill a series of holes on each side of the tablet. After passing through the firing zone all of the tablets enter a collection tube comprising an abort mechanism to separate drilled and undrilled tablets. The surfaces of the tablets are not examined and a determination that a tablet was not drilled is made by determining whether or not the laser fired a pulse at the tablet when the tablet passed through the firing zone. In order to synchronize the "laser-ready" window with the "tablet ready" window, the apparatus includes a rotary encoder to provide periodic synchronization counts to the controller to synchronize the position of the moving tablets on the carrier means relative to the firing zone. Since the laser only fires when the "laser-ready" and "tablet ready" windows are synchronized, a lead counter means responsive to the synchronization increment counts from the encoder is used to define the distance along the tablet path between the synchronization home count and the start of the treatment window corresponding to the leading edge of the treatment site on the moving tablet. Likewise, a window counter means responsive to the lead counter means and to the synchronization increment counts is used to define the distance along the tablet path between the start of the treatment window and the end of the treatment window corresponding to the trailing edge of the treatment site on the moving tablet. This system does not employ a sensor that actually detects the presence of a tablet in the slot of a conveyor, nor does it permit immediate return of undrilled tablets to the tablet reservoir. This system results in excess product loss due to the number of tablets that pass through the firing zone without being drilled. It also does not include process validation means or tablet inspection means subsequent to the firing zone to inspect the surface of the tablet shortly after drilling, validate performance of the apparatus and/or control operation of tablet diverting means.

While each of known systems includes its own advantages, each system is limited by one or more features that cause low rates of solids recovery. A need remains for a laser drilling system, optionally having an inspection system, that provides for high solids recovery and accurate drilling while at the same time providing ease of use and high efficiency.

SUMMARY OF THE INVENTION

The present laser drilling apparatus overcomes many of the disadvantages inherent in related prior art apparatuses by reducing the amount of solids lost due to malfunction or misfiring of the laser, by increasing process efficiency and improving system performance. Unlike the known systems, the present system also includes an optional process validation system. According to the embodiment of the invention, the laser apparatus is capable of: 1) immediately returning undrilled solids back to the solids reservoir; 2) detecting the presence of a solid in the solids chamber of an indexer by means other than deflection of the laser beam; 3) detecting the color of the surface of the solid prior to and, optionally, after drilling; 4) rejecting and, optionally, repositioning solids in the solids chamber of the indexer prior to drilling; 5) electronically and, optionally visually, inspecting the surface of the solid shortly after drilling to confirm the presence of a hole, the location of the hole, the number of holes and/or the shape of the hole; 6) electronically inspecting the surface of the solid to determine its color; 7) validating process performance by employing redundant but different sensing or detection means; 8) providing a summary of system performance for the laser drilling system; 9) synchronizing operation of multiple components of the laser apparatus; and/or 10) drilling tablets in a continuous, semi-continuous or batchwise operation.

One aspect of the invention provides a laser drilling system comprising:

a laser device that directs a pulsing laser beam at a firing zone;

a solids reservoir;

a continuous solids indexer comprising plural solids-receiving slots, wherein the indexer transports a solid from the reservoir through the firing zone to a delivery zone, and the laser device, in synchronization with the solids indexer, drills one or more holes or cavities in the surface of the solid; and a first rejection means between the firing zone and the delivery zone for returning undrilled solids back to the solids reservoir prior to entering the delivery zone.

Another aspect of the invention provides a laser drilling system comprising:

a laser device that directs a pulsing laser beam at a firing zone;

a solids reservoir;

a continuous solids indexer comprising plural solids-receiving slots; wherein the indexer transports a solid from the solids reservoir through the firing zone to a delivery zone, and the laser device, in synchronization with the solids indexer, drills one or more holes or cavities in the surface of the solid;

an electronic inspection device in an analysis zone between the firing zone and the delivery zone; wherein the electronic inspection device determines the presence of a hole or cavity, the location of a hole or cavity, the number of holes or cavities and/or the shape of a hole or cavity drilled in the surface of the solid and/or determines the color of the solid; and a solids-diverging means in the delivery zone and responsive to a direct or indirect signal from the inspection device.

Yet another aspect of the invention provides a laser drilling system comprising:

a laser device that directs a pulsing laser beam at a firing zone;

a solids reservoir;

a continuous solids indexer comprising plural solids-receiving slots; wherein the indexer transports a solid from the solids reservoir through a first detection zone and then the firing zone to a delivery zone, and the laser device, in synchronization with the solids indexer, drills one or more holes or cavities in the surface of the solid;

a solids detector in the first detection zone; wherein the solids detector detects the presence of a solid in a solids-receiving slot of the indexer by means other than the pulsing laser beam of the laser device; and an optional color detector that detects the color of the surface of a solid in a solids-receiving slot.

Still another aspect of the invention provides a laser drilling system comprising:

a laser device that directs a pulsing laser beam at a firing zone;

a first solids reservoir comprising a fill detector;

a solids loading means adapted to conduct solids from a second solids reservoir into the first solids reservoir; wherein the solids loading means comprises a flow controller responsive to a signal from the fill detector;

a continuous solids indexer comprising plural solids-receiving slots; wherein the indexer transports a solid from the solids reservoir through the firing zone to a delivery zone, and the laser device, in synchronization with the solids indexer, drills one or more holes or cavities in the surface of the solid; and a solids delivery zone.

Specific embodiments of the invention include combinations of the various embodiments described herein. Other embodiments include those wherein: 1) the apparatus further comprises solids-rejections means and, optionally, solids repositioning means between the solids reservoir and the firing zone; 2) the apparatus further comprises process validation means; 3) the apparatus comprises redundant detection means, wherein a first of the redundant detection means is disposed between the firing zone and the solids reservoir and the second of the redundant detection means is disposed between the firing zone and the solids delivery zone; 4) the apparatus further comprises a synchronizer that generates a synchronization signal used to synchronize operation of multiple components of the laser apparatus; 5) the apparatus is adapted for operation in a continuous, semicontinuous or batchwise manner; 6) the apparatus comprises a display for visually monitoring the operation of the inspection/validation device; 7) the inspection/validation system is computer and operator controlled; 8) the inspection/validation system employs learning, testing and inspection methods.

Other aspects of the invention provide a method of drilling a hole or cavity with a laser into a solid. The method comprises the steps of:

1) providing plural solids in a continuous solids indexer which obtains solids from a solids reservoir;

optionally first rejecting and/or repositioning an incorrectly positioned solid in the solids indexer, wherein a first rejected solid, if formed, is returned to the solids reservoir;

optionally detecting the presence and/or color of the solid in the solids indexer;

2) striking a solid with a laser pulse as the solids indexer passes it through a firing zone to form one or more holes, cavities or a combination thereof on the surface of the solid;

optionally second rejecting the solid if no hole or cavity is formed on the solid, wherein the second rejected solid, if present, is returned to the solids reservoir;

3) delivering the solid to a delivery zone;

optionally inspecting the solid to determine the presence of a hole or cavity, the location of a hole or cavity, the number of holes or cavities and/or the shape of a hole or cavity drilled in the surface of the solid and/or determine the color of the solid;

4) directing a correctly drilled, and optionally correctly colored, solid to an acceptance zone and directing a incorrectly drilled, optionally incorrectly colored, or optionally incorrectly drilled and incorrectly colored solid to a rejection zone.

Specific embodiments of the method include those wherein: 1) one or more of the above-described optional steps is performed; 2) the laser pulse comprises two or more micropulses; 3) additional solids are loaded into the solids reservoir in response to a direct or indirect signal generated by a fill detector; 4) the solids are loaded by gravity into the slots of the indexer; 5) the solids are inspected by capturing an electronic image of the solid and analyzing the captured image by comparing it to reference images; 6) the solids are first and second rejected by way of a stream or pulse of pressurized air; 7) the solids are directed to an acceptance zone or rejection zone by solids-diverging means; and/or 8) the slots of the indexer pass through the loading zone, firing zone, inspection zone, delivery zone and back to the loading zone.

Another aspect of the invention provides a control system for controlling operation of the laser drilling system. The control system employs a combination of software and hardware and controls operation of the various components of the system described above. The control system generally employs hardware for synchronizing and actuating operation of the detectors (sensors) and software for controlling the inspection, validation, and detection operations.

Other features, advantages and embodiments of the invention will become apparent to those skilled in the art by the following description, accompanying examples and appended claims.

BRIEF DESCRIPTION OF THE FIGURES

The following drawings are part of the present specification and are included to further demonstrate certain aspects of the invention. The invention may be better understood by reference to one or more of these drawings in combination with the detailed description of the specific embodiments presented herein.

FIGS. 1a–1c depict cross-sectional views of solids having cavities drilled in the surfaces thereof by the laser drilling system.

FIG. 13a depicts a laser penetrating the surface of a tablet at different depths.

FIG. 13b depicts a laser forming a slot on the surface of a tablet by sliding the tablet under the laser during the period it fires a pulse.

FIG. 14 depicts a top plan view of various different cavities that are formed by the laser system.

DETAILED DESCRIPTION OF THE INVENTION

Figure 2:
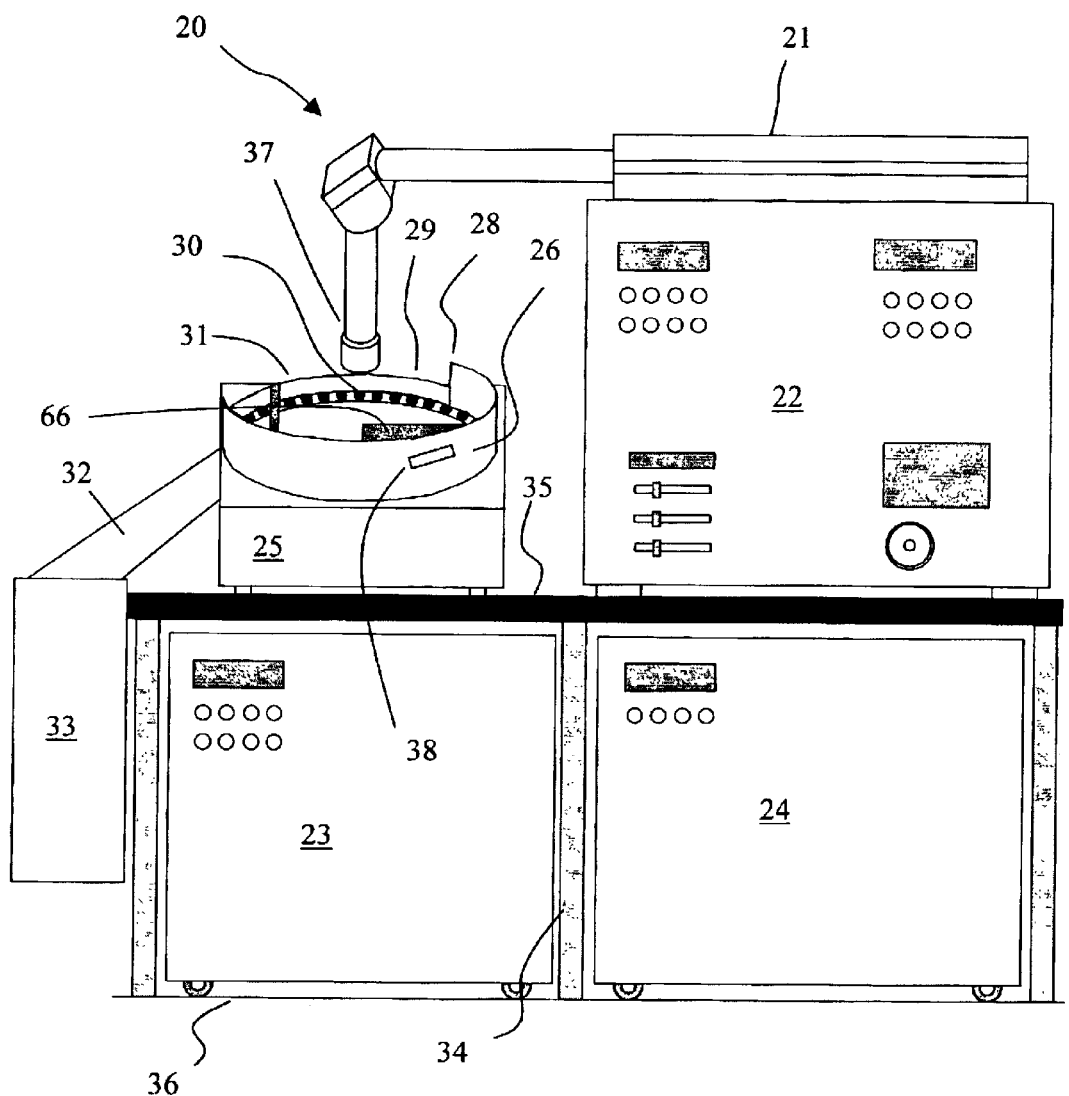
FIG. 2 depicts a front elevation of a first embodiment of the laser drilling system.

A solid dosage form process with the system of the invention will include a hole or cavity formed by a laser. FIG. 1a depicts a coated solid (1), such as an osmotic device, including a first cavity (4) formed in the coat (3) surrounding the core (2) of the solid. The cavity was formed by striking the coat with a low-intensity, short pulse width, laser pulse in the firing zone of the laser drilling system. The solid (1) also includes a cavity, in the core, and a superposing hole (5), in the coat, of the solid. The cavity and hole (5) were formed by striking the solid with a moderate to high intensity, short pulse width, laser pulse, thereby completely penetrating the coat and only partially penetrating the core of the solid.

FIG. 1b depicts an uncoated tablet (10) having an extended cavity (channel) (11) and three circular cavities (12a–12c) on its surface. The channel was formed by striking the tablet with a low to moderate intensity, long pulse width, laser pulse as the tablet was passed under the laser by the solids indexer. By sequentially striking the same tablet with one or more short pulse width laser pulses and one or more long pulse width laser pulses, the tablet can be made to include a linear combination of at least one round cavity (12a) and at least one channel (11), or various other combinations of short cavities and long cavities.

FIG. 1c depicts an uncoated solid (15) comprising a long cavity (16) having a non-uniform depth. The cavity is formed by striking the solid with a laser pulse having a modulated pulse intensity. The modulated pulse comprised low intensity initial and final parts and a moderate intensity intermediate part. The first part (16a) of the cavity has a downwardly tapered depth formed by a first modulated intensity pulse. The middle part (16b) of the cavity has a constant depth formed by a constant intensity pulse. The last part (16c) of the cavity has an upwardly tapered depth formed by another modulated intensity pulse. A modulated pulse is a laser pulse which intensity changes from the beginning of the pulse to the end of the pulse or to about the middle of the pulse. An increased intensity modulated pulse has a lower initial intensity and a higher ending intensity. A decreased intensity modulated pulse has a higher initial intensity and a lower ending intensity. The method of making a modulated pulse is detailed below.

The laser apparatus can be used to make surface markings, cuttings, grooves, letters and/or numerals for the purposes of decoration, identification and/or other purposes on the surfaces of solids, in particular tablets.

Although FIGS. 1a–1c depict a solid dosage form as an oval pill or rectangular tablet, it should be understood that the solid can assume any shape or form. That is, the solid may assume any different shape and/or size that is optimal for the intended environment of use. In particular embodiments, the shape and size of the solid will be optimal for use administration to mammals such as animals or human beings. The solid used in the apparatus of the invention can also be a pill, osmotic device, capsule, sphere, tablet, pastille, mini-tablet, bar, plate, granule, or agglomerate.

FIG. 2 depicts an exemplary laser drilling system (20) comprising a laser device (21), loading zone (66), first rejection zone (28), first inspection zone (29), firing zone (30), a solids handling system (25), second inspection zone (31) and a solids delivery zone (32). The solids handling system includes a continuous solids indexer comprising plural slots. The slots of the indexer repeatedly course their way from the loading zone (66) through the various zones (28, 29, 30, 31 and 32) and back to the loading zone (66). Therefore, a solid from the solids reservoir is sequentially conducted by the solids indexer through the same zones; however, if the solid has been successfully drilled by the laser, then it does not return to the loading zone. A solid that is incorrectly drilled is passed onto the rejection container (33).

The loading zone (66) includes a solids reservoir (26) from which solids are continuously loaded by gravity into the slots of the solids indexer. The solids reservoir can be any open or closed container or conduit capable of temporarily retaining a solid and loading the solid into the slots of indexer. The exemplary solids reservoir (26) comprises a wall that resembles a portion of an open upright cylindrical container. The loading zone also includes an optional fill or level detector (38) that detects the level of solids in the reservoir.

The laser drilling system (20) includes a control center (22) that controls operation of various components of the laser drilling system. The control center includes hardware and software controls and a number of electronic components.

Since the laser device (21) generates a significant amount of heat, the laser drilling system also includes a cooler (24) that conducts cooling fluid to and from the laser device. The cooling fluid can be any gas and/or liquid used for cooling lasers. The laser beam emitted by the laser device is conducted to the firing zone (30) by way of an oscillating mirror and conduits (see FIG. 18).

The laser device creates a cavity or hole in a solid by burning or attritting the solid with an intense pulse of light. The burning creates fumes, smoke and/or microparticles that might be irritants. The laser drilling system, therefore, includes an air handling and filtration system (23) that aspirates the fumes, smoke and/or microparticles and removes them from the vicinity of the firing zone.

The various components of the system can be mounted on the floor (36) or a working surface, such as the tabletop (35), which is supported by a frame (34), or a combination thereof.

Figure 3:
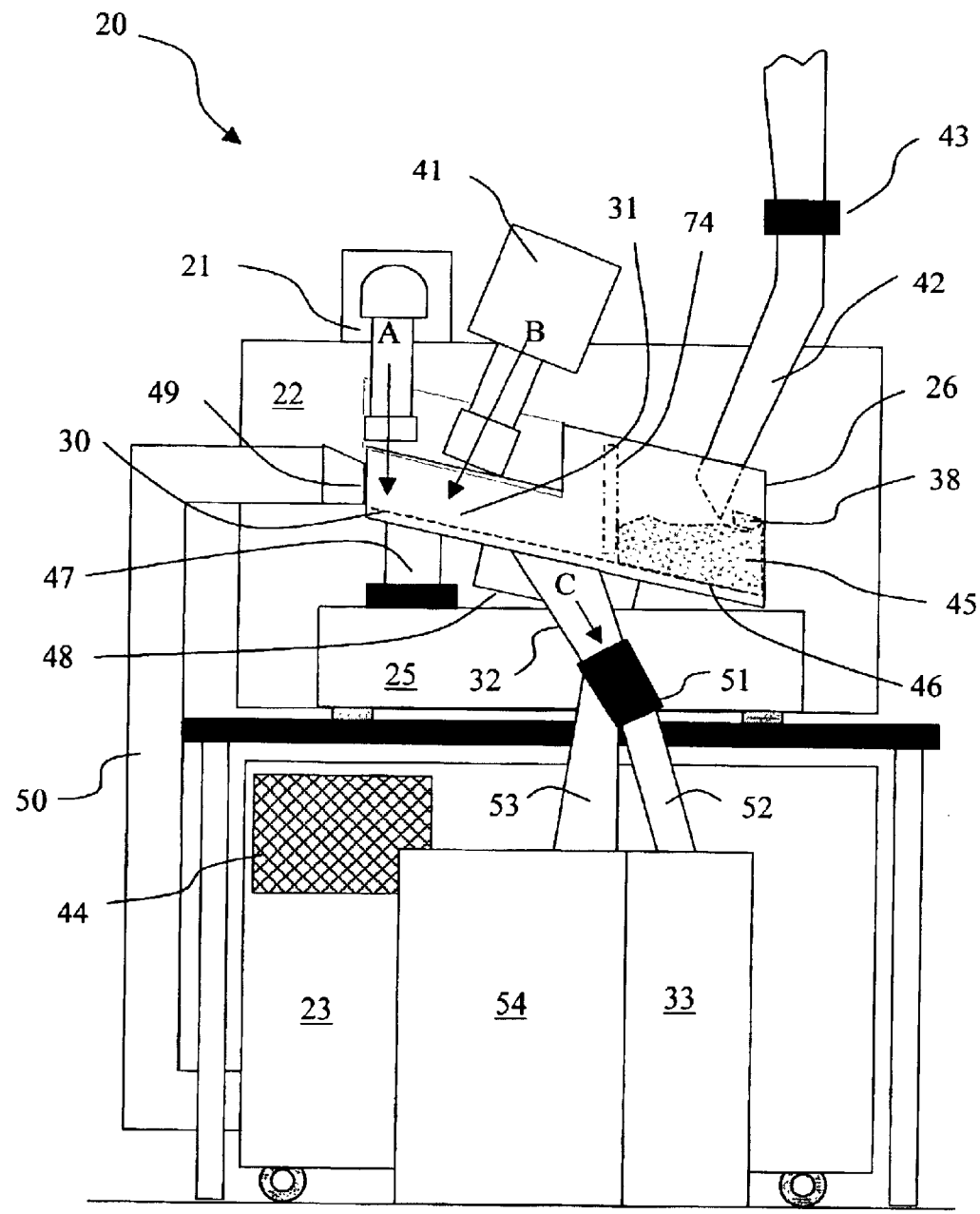
FIG. 3 depicts a right side elevation of the system of FIG. 2.

FIG. 3 depicts a right side elevation of the laser drilling system (20) except that an inspection system (41) and a loading chute (42) have been added. In this embodiment, the solids delivery chute (32) is attached to a solids-diverging mechanism (51) that directs drilled solids to either an accepted-solids chute (53) or a rejected-solids chute (52). The chutes (52 and 53) conduct their respective solids to containers (33) and (54), respectively. Operation of the solids-diverging mechanism (51) is controlled by the inspection system if present. When a solid is deemed acceptable by the inspection system, the inspection system sends a signal to the appropriate control means such that the solids-diverging mechanism diverges solids to the accepted-solids chute. Likewise, when a solid is rejected by the inspection system, the inspection system sends a signal to the appropriate control means such that the solids-diverging mechanism diverges solids to the rejected-solids chute.

The solids handling system (25) includes a lift (47) that tilts the solids containment and handling assembly (26) upwardly such that solids in the assembly tend to fall into the solids reservoir. The height of the assembly is thus adjustable. The lift also serves to adjust the proximity of the solids surface to the laser.

The inspection system (41) includes a camera directed at the second inspection zone (31) located between the firing zone (30) and the solids delivery chute (32). After a solid has passed through the firing zone, the camera captures an electronic (digital or analog) image of the solid. The image is sent to a computerized process validation system that determines the location, presence, and size of the cavity drilled in the solid. The validation system optionally also determines the number of cavities in the solid and/or the color of the solid. If the solid is acceptable, it is conducted through an opening in the bottom of the assembly (26) at which point it drops into the delivery chute (32) approximately in the direction of the arrow (C).

The above-mentioned air handling system (23) includes an aspiration conduit (50) that draws air, smoke, fumes and microparticles from an aperture (49) adjacent the firing zone to the air filtration system. Purified air is released through the vent (44) into the operating environment or into a chase that conducts the air away from the system. Although depicted with an aperture in the sidewall of the containment assembly, the aspiration conduit can also be provided as a tube that is placed over the sidewall rather than through it.

The solids reservoir is defined by the wall of the containment system (26) and a partition (74), which is between the reservoir and the firing zone. If the height of the solids (45) drops below a predetermined level, the fill detector (38) sends a signal to a solids loading control means (43) such that additional solids are conducted through the solids delivery chute (42) and into the reservoir.

Figure 4:
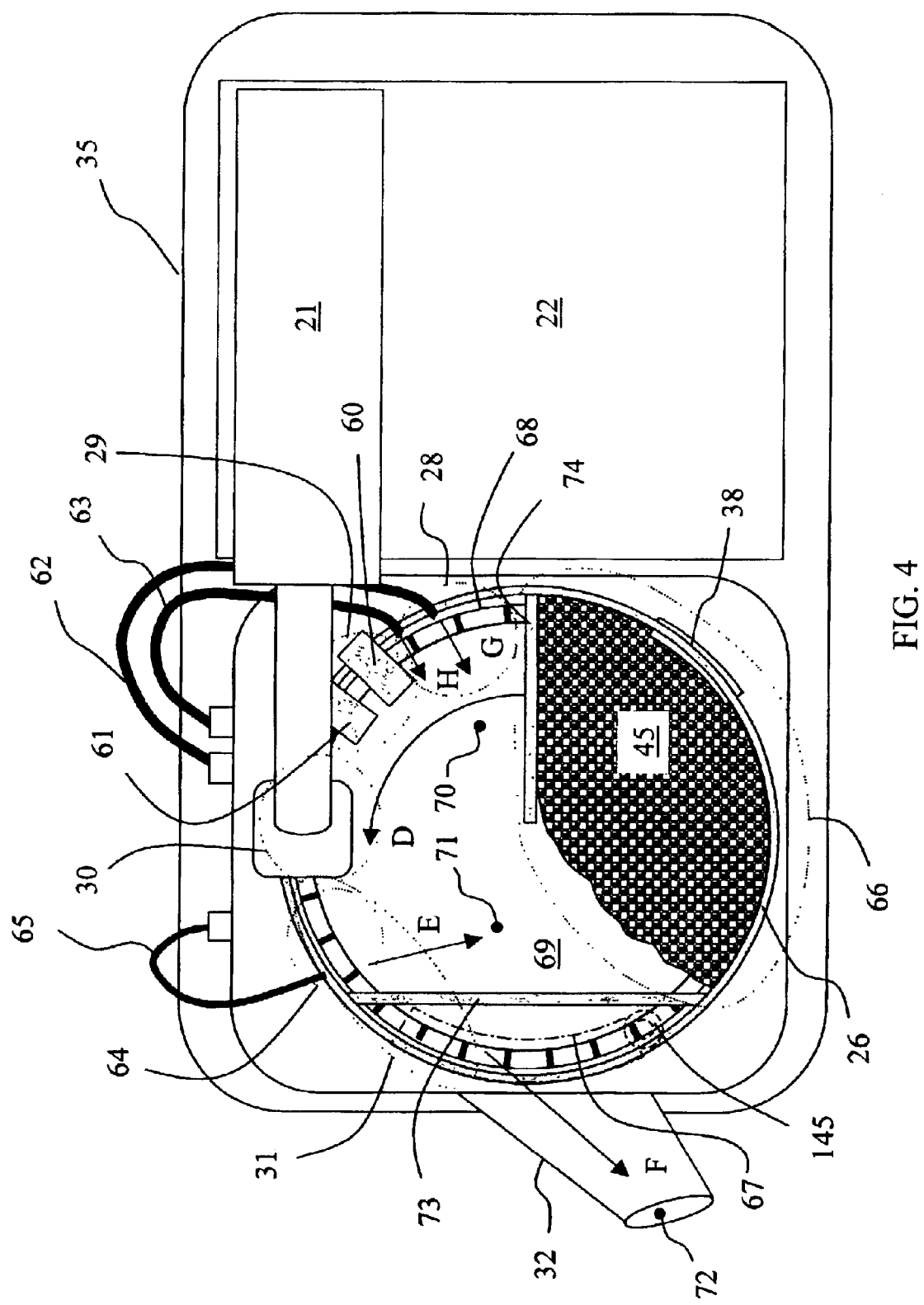
FIG. 4 depicts a top plan view of the system of FIG. 2.

FIG. 4 depicts a top plan view of the laser drilling system (20), which includes the solids loading zone (66), first rejection zone (28), first inspection zone (29), firing zone (30), second rejection zone (64), second inspection zone (31), and solids delivery aperture (67). The loading zone includes the solids reservoir and is defined by the partition (74), the partition (73), the upper surface of the solids indexer (69), and the wall of the solids containment assembly (26). The laser drilling system can also include a cover (not shown) or enclosure (not shown) for the solids handling assembly or for the entire laser drilling system. Since the indexer rotates counterclockwise in the direction of the arrow (D), the solids (45) are urged in placed by the frictional force of the upper surface of the indexer with the solids. The solids are loaded by gravity into the slots (68) located at the periphery of the indexer. The solids are then conducted to the first rejection zone in which solids that are incorrectly positioned in the slots are rejected and/or repositioned in the approximate direction of the arrows (G) and (H) by the rejection means (62) and the repositioning means (63). The solid (70) is depicted shortly after it has been rejected.

The correctly positioned solids are then conducted to the first inspection zone in which the presence or absence of a solid in each slot is determined by the solids detector (60). The first inspection zone can also include an optional color detector (61) that determines or confirms the correct color of the solids being drilled.

A correctly colored solid is conducted to the firing zone (30) in which the laser device fires a laser pulse at the solid and drills a cavity into the surface thereof. The laser will only fire a pulse at a solid in a particular slot if the solids detector has previously confirmed the presence of the solid in that particular slot.

The solids are then conducted to the optional second rejection zone (64) in which undrilled solids are removed from their respective slots (68) and propelled toward the solids loading zone in the approximate direction of the arrow (E) by the second solids rejection zone (64). The solid (71) is depicted shortly after it has been rejected. An optional air nozzle is included adjacent the second solids rejection zone to urge rejected solids (71) as well as overflow solids from the reservoir back to the reservoir.

The correctly drilled solids are then conducted to the second inspection zone (31), which can be in overlapping arrangement with the second rejection zone. The second inspection includes second inspection means that confirm/validate the results observed by the first inspection means (solids detector and optional color detector). In one embodiment, the second inspection means includes the camera system described herein. The partition (73) separates the firing zone from the solids delivery zone. Since the camera confirms the predetermined presence, and optionally color, of the solid in the slot, it is considered a redundant inspection means, and it is used as part of a process validation system.

The bottom of the containment assembly (26) includes an elongated aperture (67) through which drop drilled and correctly colored solids that made it past the partition (73). The solid (72) fell through the aperture (67) and the solids delivery chute (32). Alternatively, the elongated aperture can be on the sidewall of the containment assembly such that solids will be propelled there through.

Figure 5:
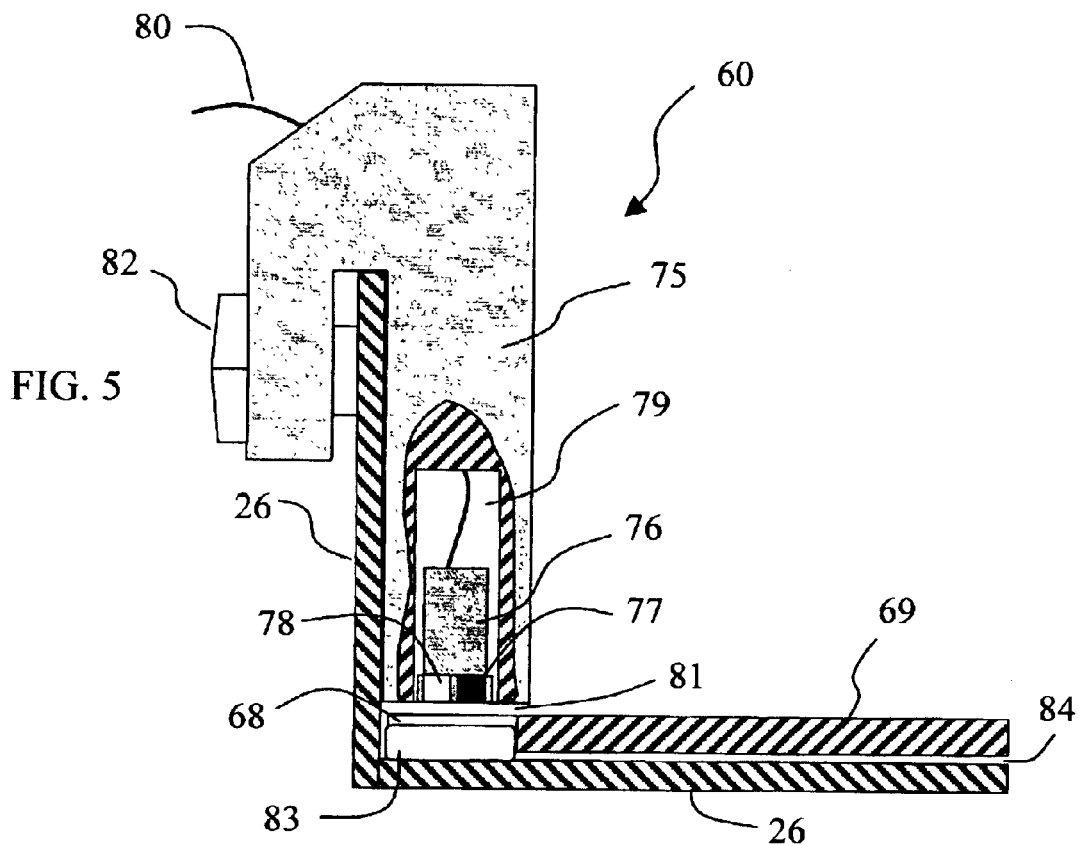
FIG. 5 depicts a partial sectional view of an exemplary solids detector.

FIG. 5 depicts the solids detector (60) comprising a body (75) held in place against the wall of the containment assembly (26) by fastening means (82). The detector includes a cavity or bore containing solids detection means (76) comprising signal emitting means (78) and signal receiving means (77). The signal emitting means emits a signal (infrared, ultraviolet, visible or other wavelength) each time a slot passes under the detector. The signal emitting means can also be a laser pointer. When the reflected signal is received by the signal receiving means at the same time that the slot is under the detector, the detector confirms the presence of the tablet (83) in the slot. As depicted, the lower surface of the indexer (69) is adjacent but spaced away (84) from the bottom of the containment assembly. Likewise, the detector (60) is spaced away (81) from the top surface of the indexer. The vertical spacing from the bottom of the assembly as well as the radial distance from the sidewall of the assembly can be made adjustable or fixed. The detector is operably connected (80) to the control system. The solids detector then generates a signal that is sent to the control system, which then identifies that slot as a slot that contains a solid. The control system then instructs the laser device to fire a pulse at that slot as it passes through the firing zone. Although one exemplary embodiment is depicted, any detector that can be used to detect the presence of a solid in a predetermined area can be used here. It is only necessary, according to the invention, that the solids detector operate in synchronization with the laser device and synchronizer as described below. The solids detector optionally operates in synchronization with the solids rejection means (105). In one embodiment, the solids detector is an infrared or laser proximity detector. The solids detector (60) can be constructed just like the color detector (61); however, its operation will permit it to determine the presence and optionally the color of a solid.

Figure 6:
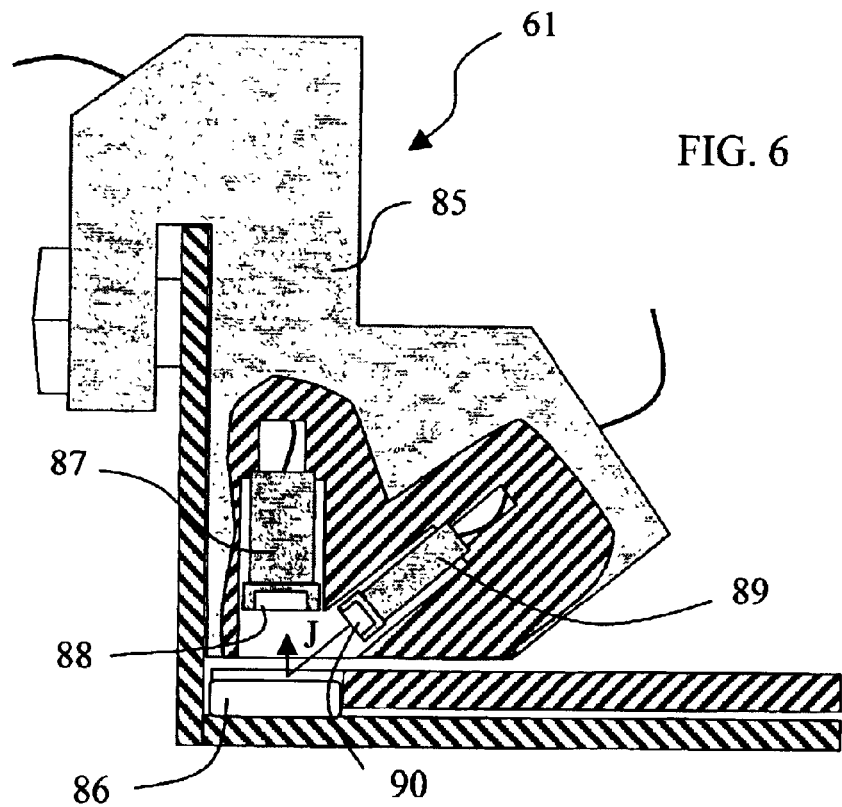
FIG. 6 depicts a partial sectional view of an exemplary color detector.

FIG. 6 depicts a color detector (61) that is optionally included in the laser drilling system of the invention. In the pharmaceutical industry, osmotic devices including differently colored upper and lower surfaces are known. At times, it is necessary to distinguish the differently colored surfaces of a solid such that only the surface having a predetermined color is drilled. A process employing bi-colored tablets, or osmotic devices, is referred to herein as a bi-color process. The color detector of the invention is used to determine whether or not the correct face of an osmotic device tablet is facing the laser device prior to drilling. Alternatively, the color detector is used to distinguish differently colored tablets in a batch containing a mixture of colored tablets, so that only tablets of the desired color will be drilled.

The exemplary fiber optic color detector (61) includes a light emitter (89) disposed within a cavity or bore of the body (85). The light emitter comprises light emitting means (90) that projects light in the approximate direction of the arrow (J) to the surface of the tablet (86). The projected light reflects upwardly toward the light detector (87) and its respective light detecting means (88). The light detector is connected to a signal analyzer (not shown) that is trainable. Fiber optic conduits can be used to connect the light emitting means and light detecting means to the signal analyzer. The signal analyzer is trained by first passing correctly colored solids under the color detector and second indicating, to the signal analyzer, that the observed color is the correct color. The analyzer then correlates the signal generated by the light detector with an indication that the tablet is a correctly colored tablet. Once the signal analyzer is taught what to identify as the correct color, it is tested by passing incorrectly colored tablets through the color detector at which time the signal analyzer should generate a signal indicating the tablet is in fact incorrectly colored. This training cycle is performed for tablets of any color so that the detector will distinguish between correctly and incorrectly colored tablets. When production is underway, the signal analyzer analyzes the signal generated by the color detector for each solid. If that signal approximates or matches the reference signal, the analyzer indicates the tablet is acceptable. Consequently, a signal is sent to the laser device and a laser pulse is fired at the approved/accepted solid as it passes through the firing zone.

Figure 7:
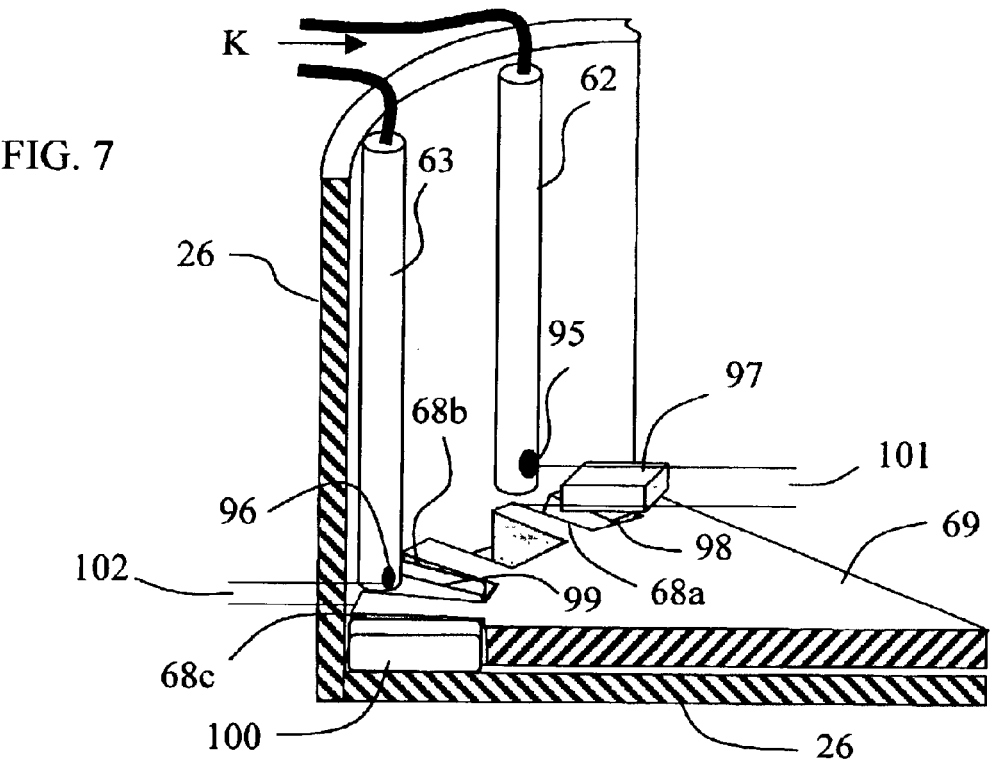
FIG. 7 depicts a partial sectional perspective view of exemplary solids rejection means and solids repositioning means between the solids reservoir and the firing zone.

FIG. 7 depicts a first solids rejection means (62) and a first solids-repositioning means (63). During operation of the solids handling system, it may occur that more than one tablet will be loaded into a single slot (68) of the indexer. For example, the tablet (97) is depicted superposing the tablet (98) in the slot (68a). As the slot (68a) passes within the vicinity of the solids rejection means (62), a jet of air is forced through the orifice (95) toward the tablet (97) thereby propelling that tablet away from the slot (68a) and toward the solids loading zone. It may also occur that a tablet in a slot will be positioned incorrectly for drilling and will need to be repositioned prior to drilling. For example, the tablet (99) is depicted askew in the slot (68b). As the slot (68b) passes in the vicinity of the solids-repositioning means, a jet of air is forced through the orifice (96) such that the tablet (99) is repositioned to a correct position or propelled away from the slot (68b) in the approximate direction of the solids loading zone. The solids-repositioning means (63) generally differs from the solids rejection means (62) in the height at which the jet of air is delivered. Generally, the distance (101) between the orifice (95) and the top surface of the indexer (69) is greater than the distance (102) between the orifice (96) and the top surface of the indexer. That said, the distance between the orifices and the top surface of the indexer can be the same. These devices might also differ in the angle at which the air is directed at the solids and/or the volume of or rate at which the air is directed at the solids. The tablet (100) is depicted correctly positioned in the slot (68c) after passing by the solids rejection means and solids-repositioning means.

Figure 8:
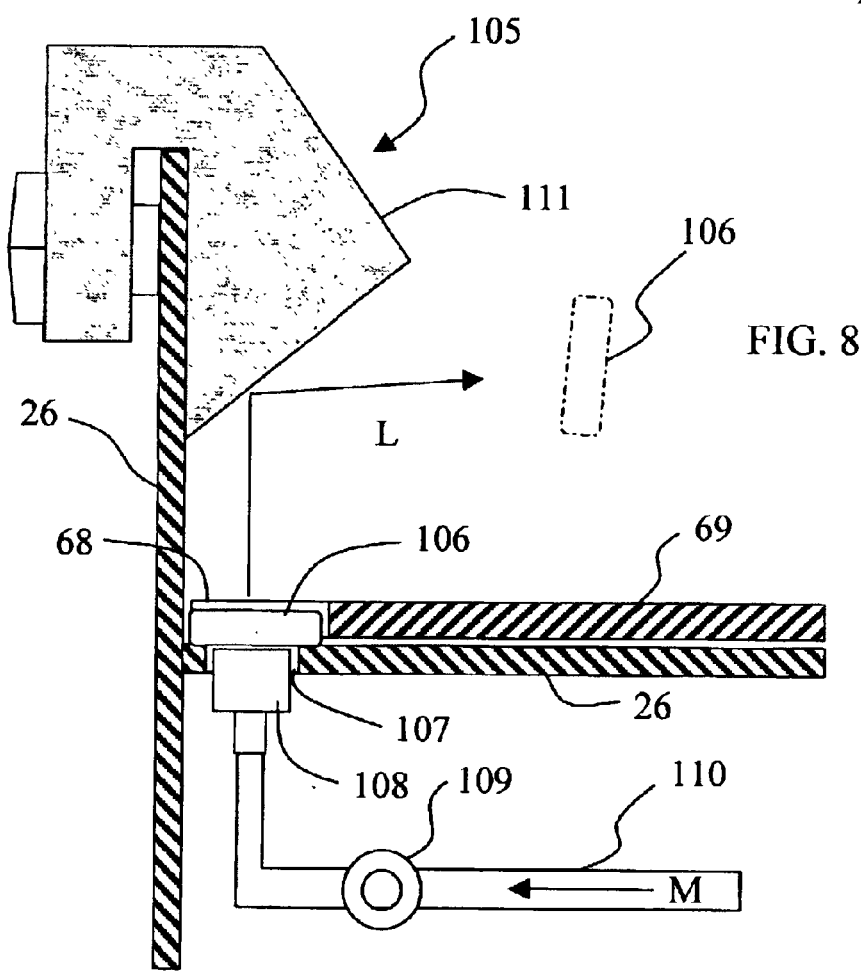
FIG. 8 depicts a partial sectional view of an exemplary solids rejection system between the firing zone and the delivery zone.

FIG. 8 depicts a second solids rejection means (105) located in the second solids rejection zone (64, FIG. 4). This solids rejection means comprises a nozzle (108) located within a hole (107) in the bottom surface of the containment assembly (26). The nozzle is positioned below the slots (68) of the indexer (69). Operation of the solids rejection means (105) is synchronized with operation of the laser device, the indexer, and synchronization means as described below. The solids rejection means is adapted to eject undrilled (rejected) solids back toward the solids reservoir. A control system operably connected to the laser device determines whether or not the laser device fired, e.g., whether or not the laser power supply has received a signal to fire, a pulse at the tablet in the slot (68). If the laser device did not fire a pulse at the tablet, the control system sends a signal so that the valve (109), which controls the flow of air from the tube (110) to the nozzle, opens and allows a burst of air to flow through the nozzle as the slot (68) and undrilled tablet (106) pass over the nozzle. The rejected tablet is propelled in the direction of the arrow (L) toward solids deflection means (111), which deflects the solid in the general direction of the solids reservoir. The solids deflection means is either integral with or attached (permanently or removably) to the wall of the containment assembly (26), or it can be placed above the nozzle by other stabilizing/positioning means. The second solids rejection means is positioned downstream from the firing zone a known number of slots. It is also positioned downstream from the solids detector a first known number of slots (referred to as the first "slot-offset") and upstream from the synchronizer by a second slot-offset. The second slot-offset need not be a known or predetermined value. Operation and setup requirements of the synchronizer with respect to the other components of the system is described below.

Figure 9:
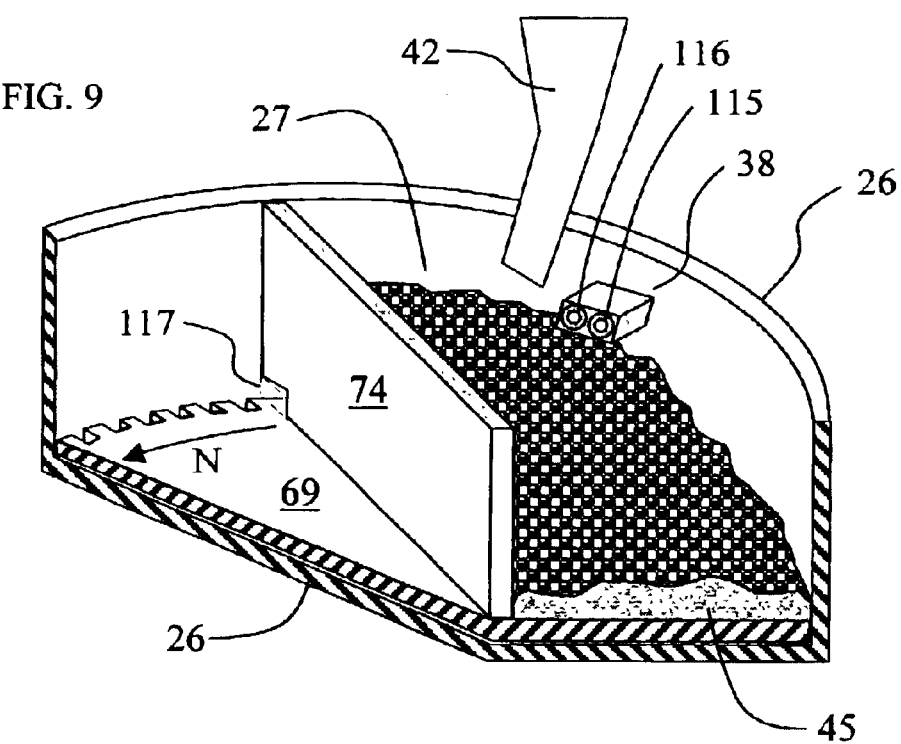
FIG. 9 depicts a partial sectional perspective view of an exemplary solids reservoir including an exemplary fill detector.

FIG. 9 depicts the solids containment and handling assembly (26) comprising the solids reservoir (27), which is defined by the partition (74), the upper surface of the indexer (69), and the wall of the assembly. Since the indexer continuously spins in the direction of the arrow (N), the solids (45) are urged in the general direction of and into the solids reservoir. By maintaining one area of the solids reservoir open, solids that are rejected by the first or second solids rejection means are loaded back into the solids reservoir by the spinning indexer. The partition (74) comprises a portion (117) that superposes the slots of the indexer and/or by directing the airflow of the solid rejection means toward the solid reservoir. This portion (117) is spaced away from the slots a distance to permit passage of one or two stacked solids but not sufficient to permit passage of four or more stacked solids (tablets). The fill detector (38) is located in the vicinity of the reservoir, in particular on, in or along the partition or the sidewall of the containment assembly. The fill detector determines the height or level of solids (45) in the reservoir (27). This exemplary fill detector comprises signal emitting means (115) and signal detecting means (116). The signal emitting means sends infrared light into the reservoir. The signal detecting means detects infrared light that is reflected from the solids in the reservoir. If the amount of infrared light detected is below a predetermined minimum, the fill detector generates a signal such that a solids-loading control means (43, FIG. 3) is actuated and more solids are loaded into the reservoir through the delivery chute (42). If the amount of infrared light detected matches or exceeds a predetermined minimum, the fill detector generates a signal such that the solids-loading control means stops the flow of solids into the reservoir. Although an infrared signal is used in this exemplary fill detector, any combination of signal emitting means and signal detecting means that are adapted to cooperate to determine the level of a material in a reservoir or container can be used. The fill detector can employ electronic and/or mechanical fill detection means. An exemplary mechanical detector includes a pivoting floating arm installed in the reservoir such that the arm lowers as the charge in the reservoir lowers thereby actuating a control means that causes more solids to be loaded into the reservoir.

Figure 10:
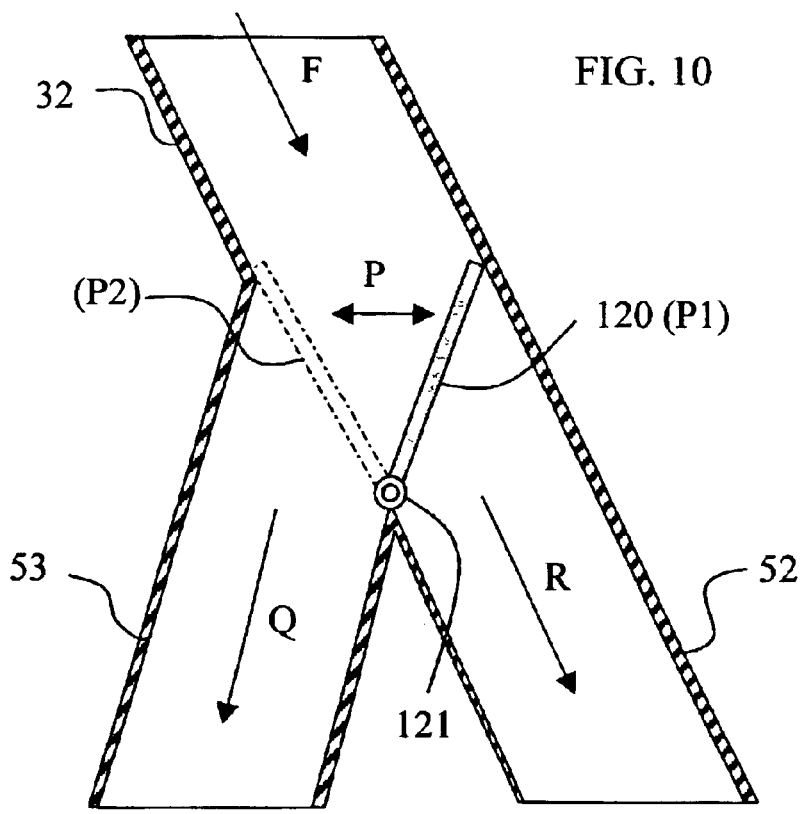
FIG. 10 depicts a perspective view of an exemplary solids delivery zone including a solids-diverging means, solids rejection zone and solids acceptance zone.

FIG. 10 depicts the solids-sorting assembly used to sort accepted and rejected solids. The sorting assembly comprises the solids delivery chute (32), which receives solids that have been accepted or rejected by the solids inspection system (41) and conducts them to the solids-diverging means. The solids-diverging means comprises a reciprocating member (120) that reciprocates along the arrow (P) between a first position (P1) and a second position (P2). In this exemplary embodiment, the reciprocating member is hingedly attached to a chute or juncture thereof, however, any means of attachment that facilitates the reciprocating action of the member can be used. The reciprocating member is moved from the first position to the second position by pneumatic, magnetic, mechanical and/or electronic means. When in the first position, the reciprocating member conducts accepted solids along the arrow (Q) into the accepted-solids chute (53) and its respective container. When in the second position, the reciprocating member conducts rejected solids along the arrow (R) into the rejected-solids chute (52) and its respective container. Although the accepted-solids chute is depicted to the left of the rejected-solids chute, the reverse orientation, and consequently reverse operation of the solids diverging means, can be used.

Operation of the solids-diverging means is synchronized with operation of the solids inspection system and the indexer. When the solids inspection system determines that a solid in a particular slot is unacceptable, it sends a signal to a control system that actuates the solids-diverging means. When the designated slot approaches or superposes the solids delivery chute, the solids-diverging means correctly positions the reciprocating member as needed to direct the falling rejected solid into the rejected-solids chute. Likewise, when the solids inspection system determines a solid in a particular slot to be acceptable, it sends a signal to a control system that actuates the solids-diverging means. When the designated slot approaches or superposes the solids delivery chute, the solids-diverging means correctly positions the reciprocating member as needed to direct the falling accepted solid into the accepted-solids chute. In one embodiment, the default position of the solids-diverging means is such that solids fall into the rejected-solids chute and the solids-diverging means must be actuated to direct solids into the accepted-solids chute.

During very fast production rates, it may become difficult to correctly position the reciprocating member so that only the rejected solid falls into the rejected-solids chute. In this case, the control system of the solids-diverging means can be set such that one or more accepted tablets before and/or one or more accepted tablets after the rejected solid are also directed into the rejected-solids chute. In one embodiment, less than 10, less than 8, less than 6 or less than 4 accepted tablets before the rejected tablet and/or less than 10, less than 8, less than 6 or less than 4 accepted tablets after the rejected tablet are directed toward the rejected-solids chute.

The laser drilling system of the invention is capable of manufacturing drilled solids at rates exceeding 100,000 drilled solids per hour. The typical production rate is between 50,000–100,000 drilled tablets per hour. Due to the design of the present system, it has a solids recovery rate of greater than about 95%, greater than about 97%, or greater than about 99%. The system has achieved a solids recovery rate of at least about 99.990%, meaning that the system typically correctly processes at least 99,990 tablets out of every 100,000 tablets. The claimed system has also achieved a 100% solids recovery rate. The term "solids recovery rate" is taken to mean the percentage of solids correctly processed by the laser drilling system, and it is calculated by dividing the total number of correctly processed solids by the total number of solids processed by the system. It should be noted that correct processing of the tablets includes, among other things, laser drilling of tablets that should be drilled, rejection of tablets that should be rejected and acceptance of tablets that should be accepted. In other words, a 100% solids recovery rate indicates that all of the solids loaded into the solids reservoir were correctly drilled and passed on to the accepted solids chute and, as needed, correctly rejected and passed on to the rejected solids chute.

Figure 11:
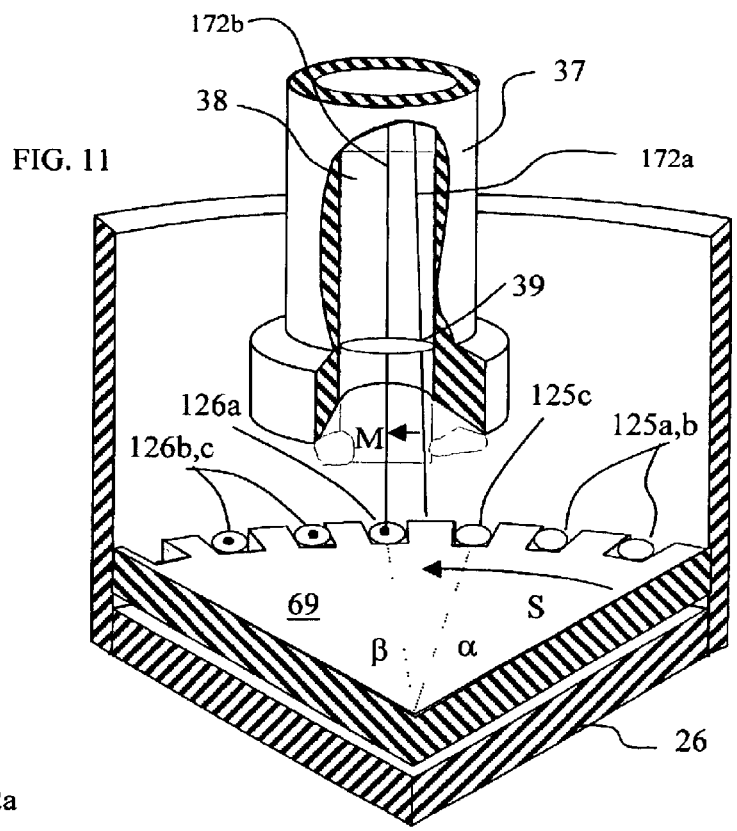
FIG. 11 depicts a partial sectional perspective front view of the firing zone of an exemplary laser drilling system in operation.

FIG. 11 depicts the firing zone of the laser drilling system. The shroud (37) of the laser device surrounds a laser beam (172a) and a lens (39) that focuses the laser beam onto the surface of a solid (126a). The laser device (21, FIGS. 2–4, 18) oscillates the laser beam in the direction of the arrow (M) such that the incident point (generally the focal point) of the laser beam tracks the slot and consequently a solid located within the slot. This tracking mechanism is particularly useful when round cavities are to be drilled onto the solids. In this example, the tablets (125a–125c) approach the firing zone. Having received a direct or indirect signal from the solids detector that the tablet (126a) is in its respective slot, the laser fires a pulse at the tablet as it courses its way from the first angular position (a, laser beam 172a) to the second angular position (β, laser beam 172b). The tablet (126a) then continues along its way with a cavity drilled into its surface just as the prior tablets (126b,c). Had the laser device received a signal that no solid was present in a predetermined slot, then no pulse would be fired at that slot. In another embodiment, the laser does not track solids in the indexer and instead fires one or more laser pulses or micropulses at a solid in a particular slot immediately under the laser emitter (127) once the solids detector has determined that a solid is present in that particular slot. Alternatively, the laser device tracks movement of the slots by oscillating in synchronization with the indexer as described below.

In alternate embodiment, the laser drilling system employs a low-energy targeting beam that tracks movement of the solids as they pass below the actual laser beam. The position on a solid upon which the targeting beam strikes is controlled by an operator by adjustment of electronic controls. Firing of the targeting beam is synchronized with the slots, so that the targeting beam is directed at the slots rather than at the spaces in the indexer between the slots. Once the targeting beam has been calibrated and correctly synchronized with the indexer, it is disabled and the laser beam is used to drill holes in the solids.

Operation of the laser device is synchronized with the solids detector (60), the indexer (69), the second rejection means (65), and synchronization means (145, depicted in phantom in FIG. 4). In addition, operation of the laser device can be synchronized with the color detector (61), the inspection system (41), and/or the solids-diverging means (51).

Figure 12A:
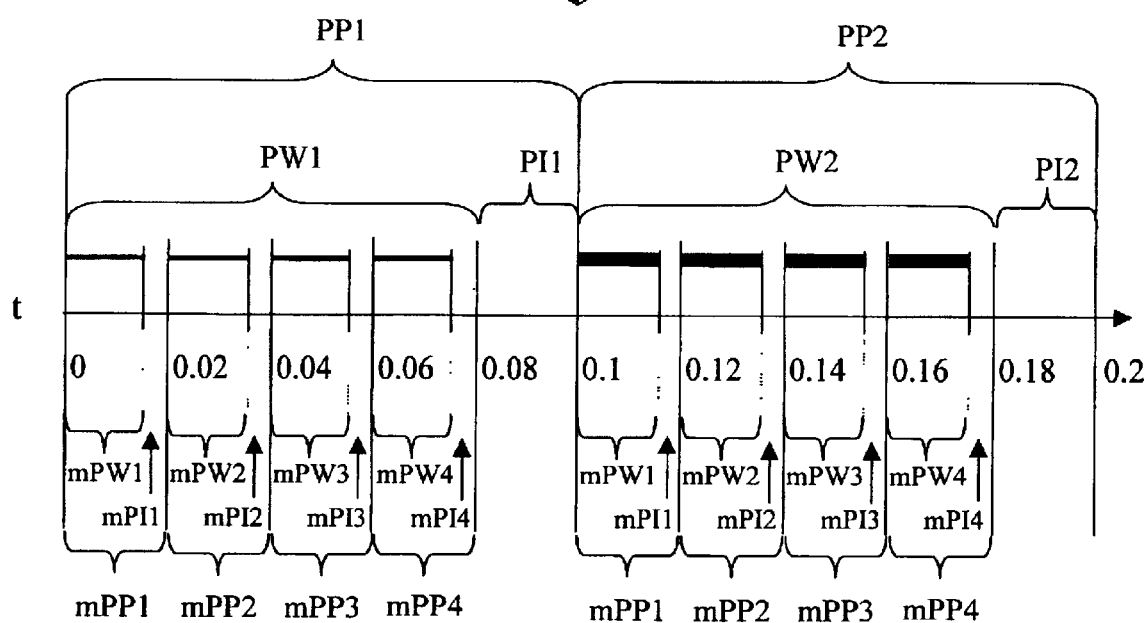
FIGS. 12a–12c depict various exemplary pulse and micropulse sequences that can be generated by the laser device.

The laser device can emit any combination of long, medium or short pulses and/or micropulses. The laser device fires a pulsing laser beam, which is a series of bursts of laser light. Each burst is considered a pulse or a group of micropulses that together form a pulse. FIG. 12a depicts a series of pulses and micropulses used to create cavities on solids. The first pulse is fired during a time period termed the pulse width (PW1). After the pulse width, there occurs a second time period termed the pulse interval (PI1) during which no pulse is fired. When added together, PW1 and PI1 equal a period of time termed the pulse period PP1, which is also the time period that occurs from the beginning of a first pulse to the beginning of a second pulse. As depicted in the exemplary time coordinate graph of FIG. 12a, PW1 equals 0.08 sec, PI1 equals 0.02 sec, and PP1 equals 0.1 sec. Likewise, PW2 equals 0.08 sec, PI2 equals 0.02 sec, and PP2 equals 0.1 sec. In this example, PW1 actually comprises four equal micropulses that occur during their respective periods mPP1, mPP2, mPP3 and mPP4. Each micropulse period comprises its respective micropulse width (mPW#) and micropulse interval (mPI#). The duration of each micropulse is indicated by the length of the line representing the micropulse; whereas the intensity of each micropulse is indicated by the thickness of the same line. As depicted the micropulses of PP1 are of the same length but of lower intensity than the micropulses of PP2. The pulse PP1 can be used to drill the cavity (4) in the tablet (1); whereas the pulse PP2 can be used to drill a cavity similar to the cavity (5) of the tablet (1).

Figure 12B:
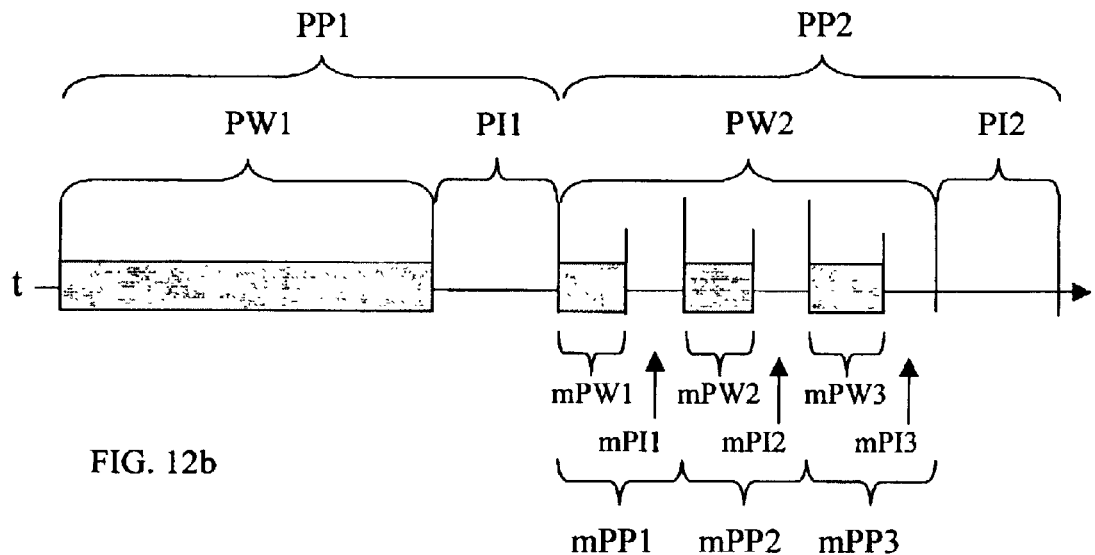

FIG. 12b depicts another exemplary firing sequence that can be created by the laser device. This particular sequence can be used to create the cavities (11) and (12a–12c) of the tablet (10). In this example, two pulses are fired at the same tablet. The first pulse includes a single PW1 and PI1, but does not include any micropulses. The second pulse includes a single PW2 and PI2; however, PW2 is comprised of three equal micropulses (mPP1–mPP3). Each micropulse is of equal duration and intensity as indicated by the relative length and thickness of the boxes representing the micropulses.

Figure 12C:
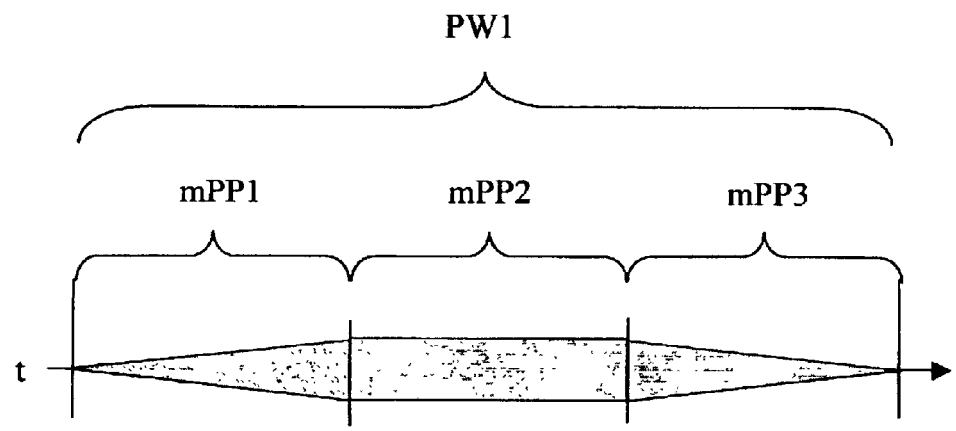

FIG. 12c depicts an exemplary pulse PW1 comprising a series of micropulses mPP1–mPP3 that can be used to create the variable depth cavity (16) on the tablet (15). As indicated by the tapered arrowheads, the micropulses mPP1 and mPP3 have modulated intensities. The micropulse mPP1 begins with a low intensity and gradually increases over a short predetermined period to a moderate intensity pulse. The micropulse mPP2 has a constant moderate intensity. The micropulse mPP3 has a modulated intensity that is about the reverse of that of mPP1, so that it begins at a moderate intensity and gradually tapers off to a low intensity beam. Although the micropulses are depicted without any micropulse interval, a very short micropulse interval can be used and still form the intended variable depth cavity.

A modulated pulse is a laser pulse having an intensity that changes from the beginning to the end of the pulse. The modulated pulse can have a first higher intensity that decreases continuously or incrementally to a second lower intensity. Alternatively, the modulated pulse can have a first lower intensity that increases continuously or incrementally to a second higher intensity. Since incremental changes in pulse intensity are possible, a modulated pulse can comprise a series of micropulses, wherein each of the micropulses has a different intensity.

As noted above, the laser device can be adapted to create almost any combination of pulses or micropulses to form one or more cavities or holes in a solid.

Independent of optic modification of the beam of the laser pulse, the length of the cavity or hole formed on the solid is a function of the pulse width, and the linear speed of the solid as it passes through the firing zone when struck by the laser pulse. In order to form a lengthened (non-uniform) cavity, a longer pulse width and/or faster linear speed (faster rotational speed for the indexer) for the solid is used. In order to form a uniform or shortened cavity, a shorter pulse width and/or slow linear speed for the solid is used. Generally, the cavity length is adjusted by varying the pulse width while keeping the linear speed of the indexer relatively constant during a run.

When the solid is a coated tablet such as an osmotic device, the size of the hole drilled through the coat (which in that case would be a microporous, semipermeable or impermeable membrane) can be varied as needed by changing the depth of penetration of the pulse, the focal length of the pulse, the intensity of the pulse, the materials used to make the coat or the core of the device, the time of exposure (or pulse width), the rotational speed of the indexer, and/or the linear speed of the slots of the indexer. FIGS. 13a–13b depict a laser pulse (128) being fired at a tablet (129). By changing the focal length of the laser, the relative distance of the laser device to the tablet, or the diameter of the laser beam (i.e., the diameter of the beam dot on the surface of the tablet), cavities of differing depths and diameters are formed. A shallow narrow diameter (W1) hole is formed by adjusting the focal point of the laser to a depth (D0) just below the surface of the tablet. Deeper and larger diameter (W2–W4) holes are formed by adjusting the focal point of the laser to deeper depths (D1–D3, respectively) below the surface of the tablet. As depicted in FIG. 13b, an elongated channel (127) is formed in the tablet by translating the tablet laterally while the pulse is fired at the tablet. The lateral translation (displacement) occurs while the tablet is being moved by the indexer of the laser system.

The cavity drilled through the coat of an osmotic device is referred to as a "preformed passageway", since it refers to a passageway or passageway precursor that has been formed on the semipermeable membrane by the laser device prior to administration of the osmotic device to a subject. The term "preformed passageway" includes one or more pores, holes apertures, channels, cavities or other similar structures known to those of ordinary skill.

Preformed passageways of different sizes, shapes and functions, such as those depicted in FIG. 14 can be formed. The passageway (130) of an osmotic device includes a central circular hole (131) that penetrates the semipermeable membrane, and two laterally extending portions (132), which are scored, or etched, regions, that do not penetrate the semipermeable membrane. When this passageway is used, the semipermeable membrane tears or dissolves along the etched regions to form the enlarged preformed passageway. The laterally extending regions can be any length desired. The passageway (133) is oval- or slot-shaped, and it penetrates the semipermeable membrane. When it is used, the preformed passageway will generally tend to tear at the ends of the slot. The passageway (134) is scored on the surface of the semipermeable membrane. The scored region ruptures during use to form the actual passageway through which active agent is released. This preformed passageway can continue to tear along the direction of the score or it can tear in random directions. The passageway (138) is similar to the passageway (131) except that the scored regions (139) have a much narrower width and shallower depth than the scored regions (132). The passageway (136) is actually a scored region on the semipermeable membrane that ruptures during use of the osmotic device.

Figure 15:
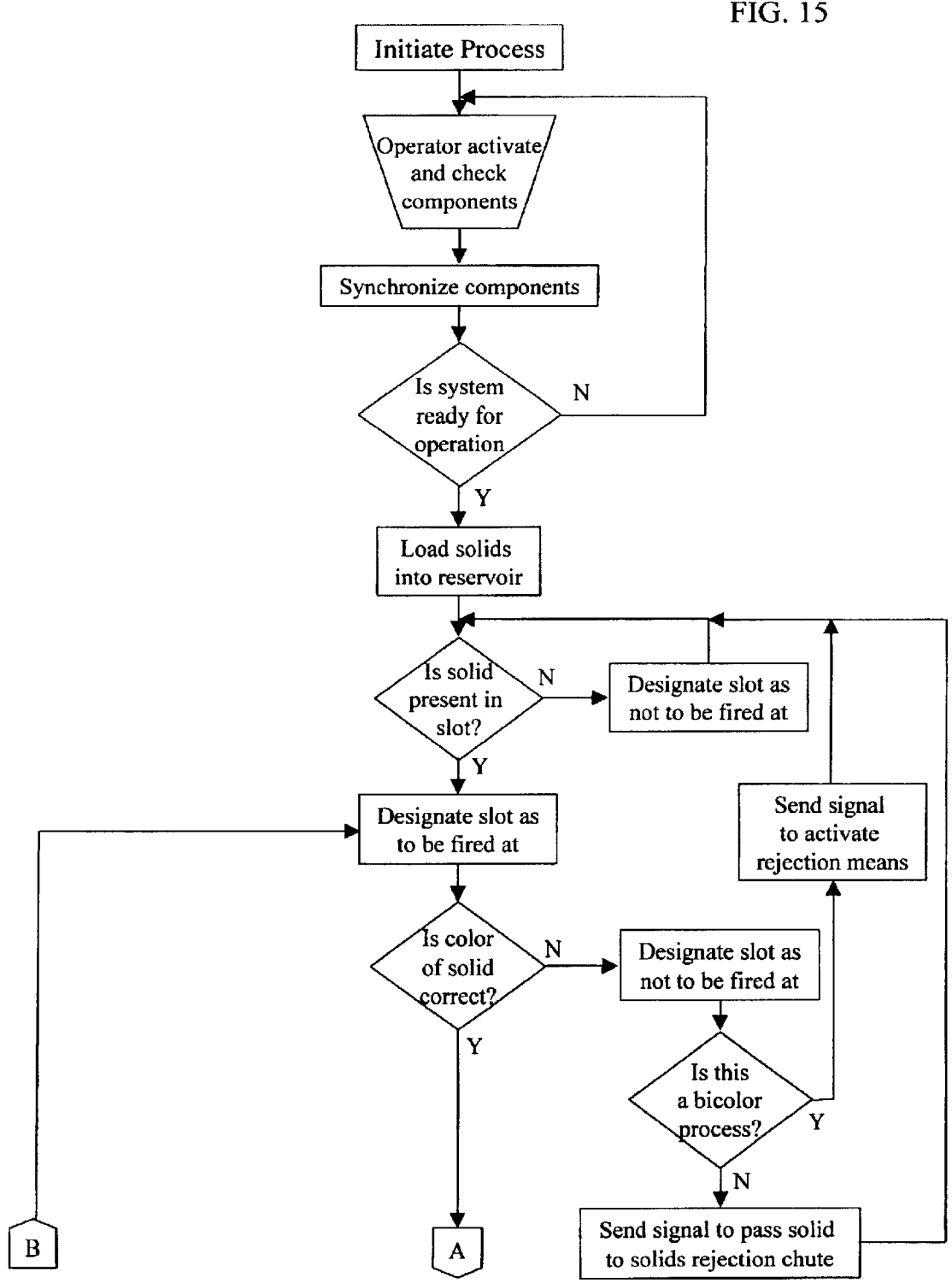
FIG. 15 depicts an exemplary logic flow chart of the control system used to control the laser drilling system.
Figure 15:
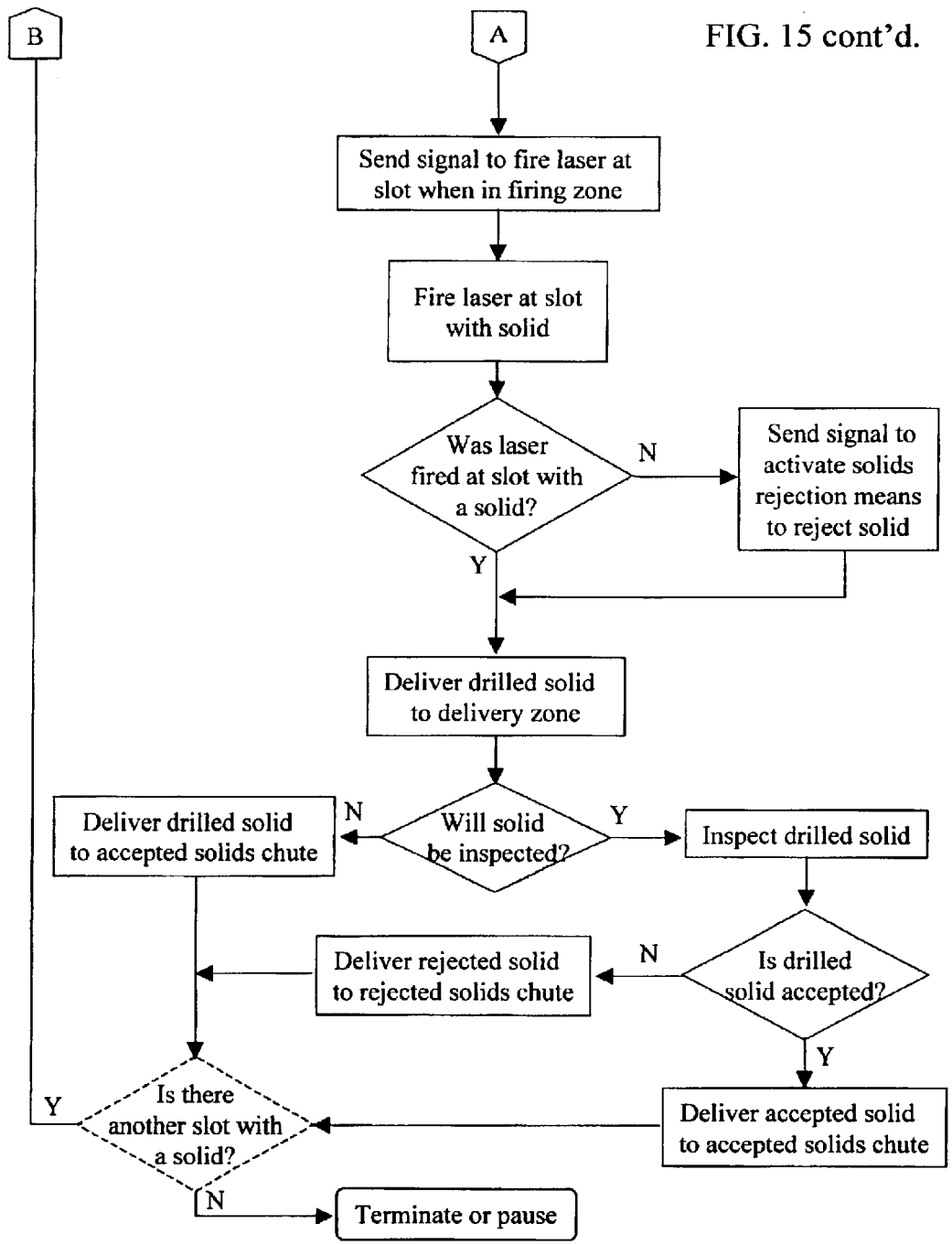

FIG. 15 depicts an exemplary flowchart that can be used in the control system that controls operation of the laser drilling system. The flowchart depicts exemplary steps performed by the laser drilling system in the handling of a solid. The operator begins operations by activating the required components and checking performance of each component. The solids indexer is then actuated and the various components of the system are synchronized as needed. The control system and/or operator determine whether or not the components are synchronized and ready for operation. If the components are synchronized, solids are loaded into the solids reservoir. Each slot courses its way through the various zones of the system. The system determines and identifies which slots contain solids. The slot identification is a slot offset relative to the home position (see text for FIG. 17), such as the location of the second rejection means or another preassigned component of the laser system. If a color detector is included, color detection occurs after the presence of a solid in a slot is confirmed by the solids detector.

The color detector determines the color of a solid in a particular slot, which slot was identified by the solids detector as containing a solid. If the solid is correctly colored, the color detector (or the signal analyzer therefor) generates a signal indicating that a laser pulse should be fired at the solid in the specified slot. If the solid is incorrectly colored, the color detector generates one of two signals: 1) if the solid has two differently colored surfaces and only one of those surfaces is to be drilled, the color detector generates a signal indicating that a laser pulse should not be fired at the solid and that the solids rejection means should reject the solid and direct it back to the solids reservoir; or 2) if the entire solid is one color and it is the incorrect color, the color detector generates a signal that a laser pulse should not be fired at the solid and that the solid should be passed on to the rejected solids chute.

When a slot containing a correctly colored solid passes through the firing zone, the laser device fires one or more pulses at the solid. The pulse(s) has (have) a predetermined width, interval and period. The system then determines whether or not a pulse was actually fired at a solid in a particular slot and whether or not there is another slot that should be fired at. If no pulse was fired and a pulse was to have been fired, then the undrilled solid is rejected by the solids rejection means and directed back to the solids reservoir. If a pulse was correctly fired, the drilled solid passes through the second solids rejection means.

If the drilled solid is not to be inspected, the system optionally determines whether or not there remain any solids that should be drilled. If so, the system returns to the indicated point in the flowchart. If the drilled solid is to be inspected, then it is inspected by the inspection system. If the drilled solid is acceptable, it is delivered to the accepted-solids chute, and if it is not acceptable, it is delivered to the rejected-solids chute.

It should be noted that the flowchart of FIG. 15 is merely one embodiment of the method of operation of the laser drilling system. It represents exemplary steps that are performed as a solid is processed through the laser drilling system. Since multiple solids are processed at the same time, these steps can occur simultaneously or in an overlapping manner. For example, the system repeatedly determines whether or not there are additional solids to be drilled while other solids are being drilled, rejected, inspected, or accepted. The step "Is there another slot with solid?" is depicted in dashed lines, since it can occur in various different places in the flowchart.

The synchronization means coordinates operation of the various components of the laser system by knowing the slot offset of each component relative to the synchronization means, or relative to whichever component is assigned the "home" position. For example, the slot adjacent the synchronization means or the slot directly below the laser beam in the firing zone can serve as the home position. For the following example, we assume that the slot beneath the laser beam in the firing zone is the home position. Where "X", "Y", "Z", "n" and "m" are whole numbers, the solids detector can have a slot offset of −X+−n from the firing zone, wherein a negative number indicates a number of slots before the home position. The color detector can have a slot offset of X from the firing zone, meaning that the color detector is closer to the home position by |−n| (the absolute value of n) slots. The second solids rejection means can have a slot offset of Y from the home position, meaning that it is located after, or downstream, from the home position. The inspection system can have a slot offset of Y+m from the firing zone, meaning that the inspection is farther away from the home position than the solids rejection means by m slots. The firing zone can have a slot offset of Z from the synchronizer. Since the various components of the system are offset from one another by a predetermined number of slots, some of the steps depicted in FIG. 15 will occur in an overlapping but offset manner for a given number of slots and respective solids. For example, while a solid in slot "−X" is having its color evaluated, a solid in the firing zone ("slot 0") is being fired at, the slot "−X+−n" is having the presence of a solid therein determined, an undrilled solid in slot "Y" is being rejected, and a drilled solid in the slot "Y+m" is being delivered to the delivery chute. The laser system can employ indexers having different numbers and sizes of slots. It is only necessary that each component that is to be synchronized with the synchronization means have a known and fixed slot offset with respect to the home-position during operation of the laser drilling system.

The synchronization means can also determine the speed of indexer so that oscillation of the oscillating mirror in the laser beam path oscillates in synchronization with the indexer. For example, if the synchronization means determines that the indexer is rotating at a speed of 20 slots per second, then it sends a signal to the controller of the scanner motor for the oscillating mirror to oscillate the mirror at a rate of 20 cycles (one forward oscillation and one reverse oscillation) per second.

Figure 17:
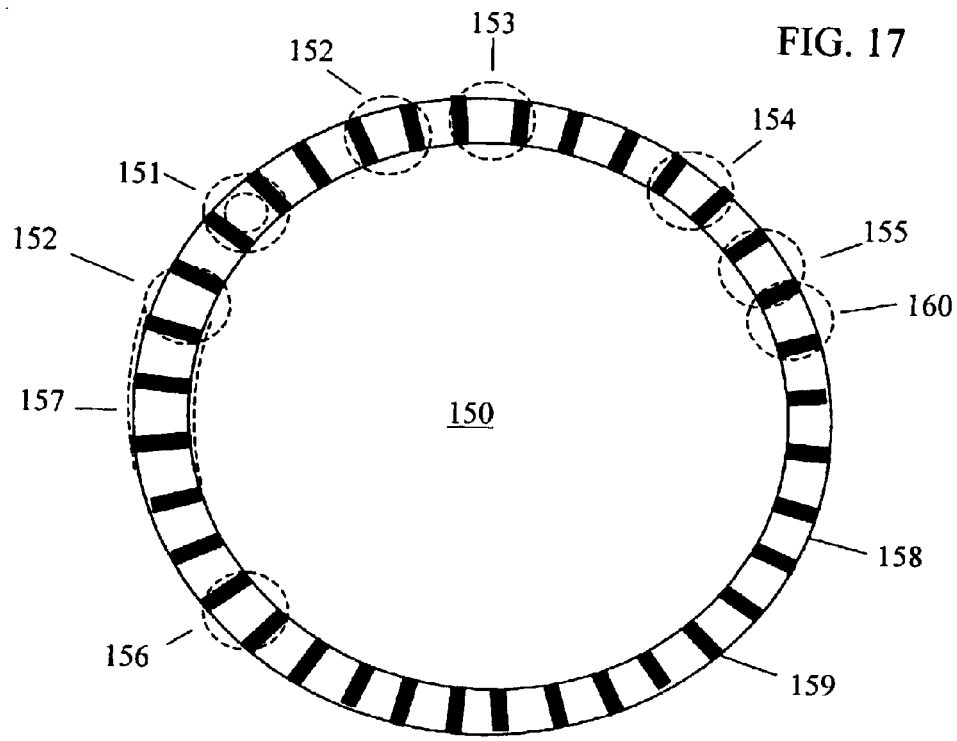
FIG. 17 depicts a top plan view of an indexer according to the invention.

In one embodiment, the home-position (HP) is the second rejection means, i.e., the aperture located in the portion of the bottom or sidewall of the solids containment assembly that is adjacent the second rejection means. The solids presence detector, the color detector and the firing zone of the laser then have a slot-offset of −Z, −Y and −X, respectively. For example, if the HP is "0", then the slot offsets can be −11, −9, and −5, respectively. The actual slot offsets used can be any whole number. It is necessary however, that the slot offset not change during operation of the system, i.e., during the drilling of a batch of solids. FIG. 17 depicts an exemplary embodiment of an arrangement of the components in terms of their respective slot-offsets. The indexer (150) comprises plural slots (158) and slot partitions (159). Zones for the components are indicated in dashed lines. The second rejection means (151) is the home-position (HP) for this example. The inspection zone (152) occurs at HP minus three slots, e.g., it has a slot offset of HP-3. Although depicted with a slot offset of HP-3, the inspection zone (152) can have a positive offset, e.g. HP+n, such as HP+1 to HP+4, meaning that the inspection zone can be located after (downstream of) the second rejection means. The firing zone (153) occurs at HP minus five slots, i.e., it has a slot offset of HP-5. The color detection zone (154) occurs at HP minus nine slots, i.e., it has a slot offset of HP-9. The solids detection zone (155) occurs at HP minus eleven slots, i.e., it has a slot offset of HP-11. The synchronization means (156) occurs at HP plus eight slots, i.e., it has a slot offset of HP+8. The solids delivery zone (157) occurs at HP plus three through five slots, i.e., it has a slot offset of HP+(3 to 5). The first solids rejection (160) means has a slot offset of HP-12 or more meaning that it is farther away from the home position than the solids detection zone. In this embodiment, each zone, except for the solids delivery zone, is simultaneously aligned with the radial and angular center of its respective slot.

The slot size can differ from one indexer to another, since the indexer can be interchangeable. Therefore, the desired slot offsets of the components can differ from one indexer to another. Accordingly, the slot-offsets described herein can vary from indexer to indexer. Alternatively, the laser drilling system can be designed such that it employs a fixed predetermined slot offset for each component regardless of the number of slots an indexer has. For example, the slot offset for each component can remain the same even though an indexer having 100 slots is replaced with an indexer having 90 slots. It is only necessary for the various components to simultaneously align with their respective slots, as described above, during operation and initial setup of the system and for the respective positions of the components to remain fixed during operation. In other words, each component or zone present will have a slot under or in it at the same time the other components or zones present will have a slot under or in it. Still further, when the indexer is still and a slot is within the detection area of the synchronization means, then a slot will also be present in the detection or action area of the other zones or components. It is preferred that each component will align itself with the angular, and optionally radial, center of its respective slot.

Even though the speed of the indexer is initially set to provide an approximate predetermined product throughput, the synchronization means repeatedly determines the speed of the indexer during operation in order to maintain all components in synchronization. In this manner, the oscillating mirror of the laser can be made to oscillate in synchronization with the slots of the indexer as needed.

Figure 16:
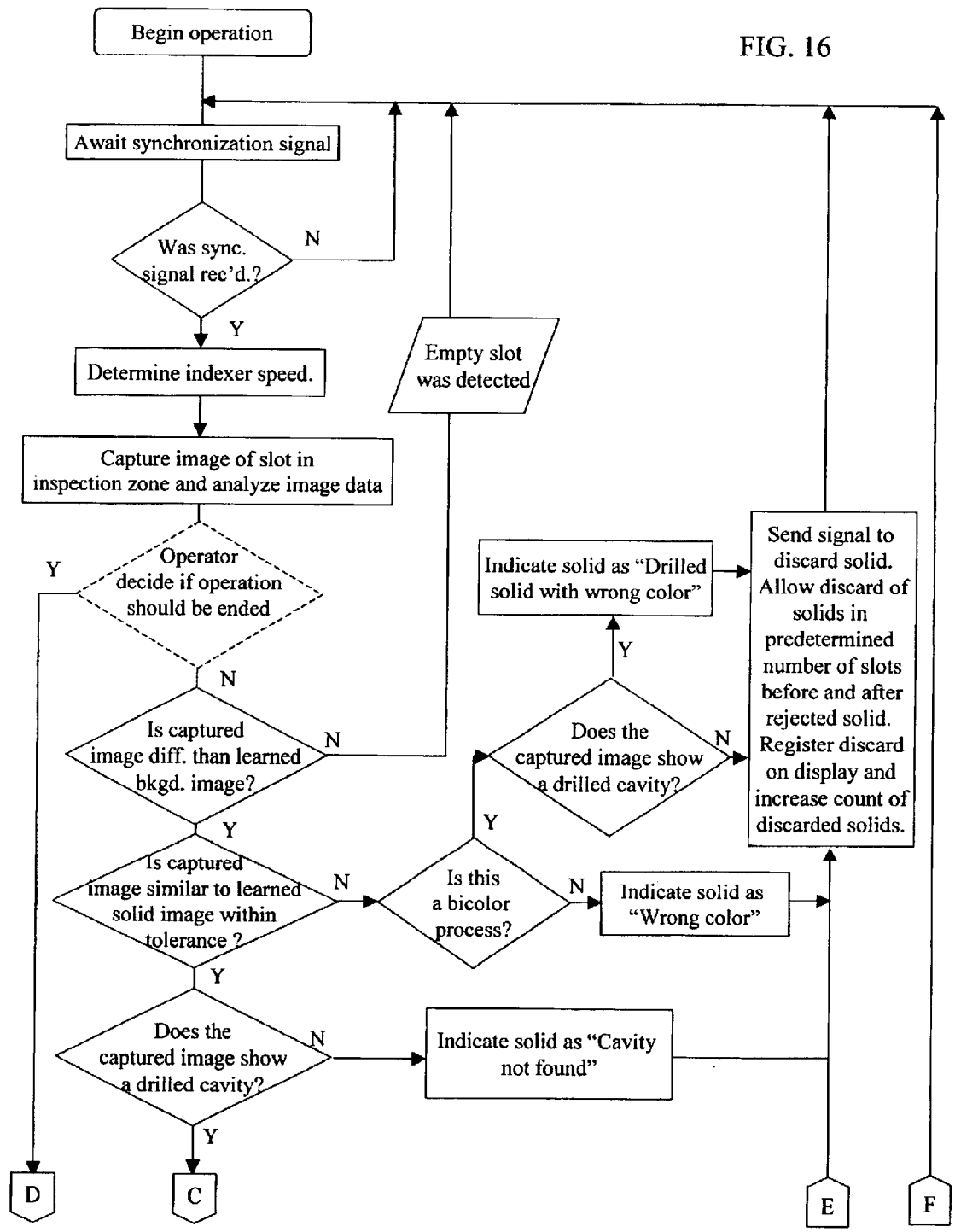
FIG. 16 depicts an exemplary logic flow chart of the control system used to control the process validation system.
Figure 16:
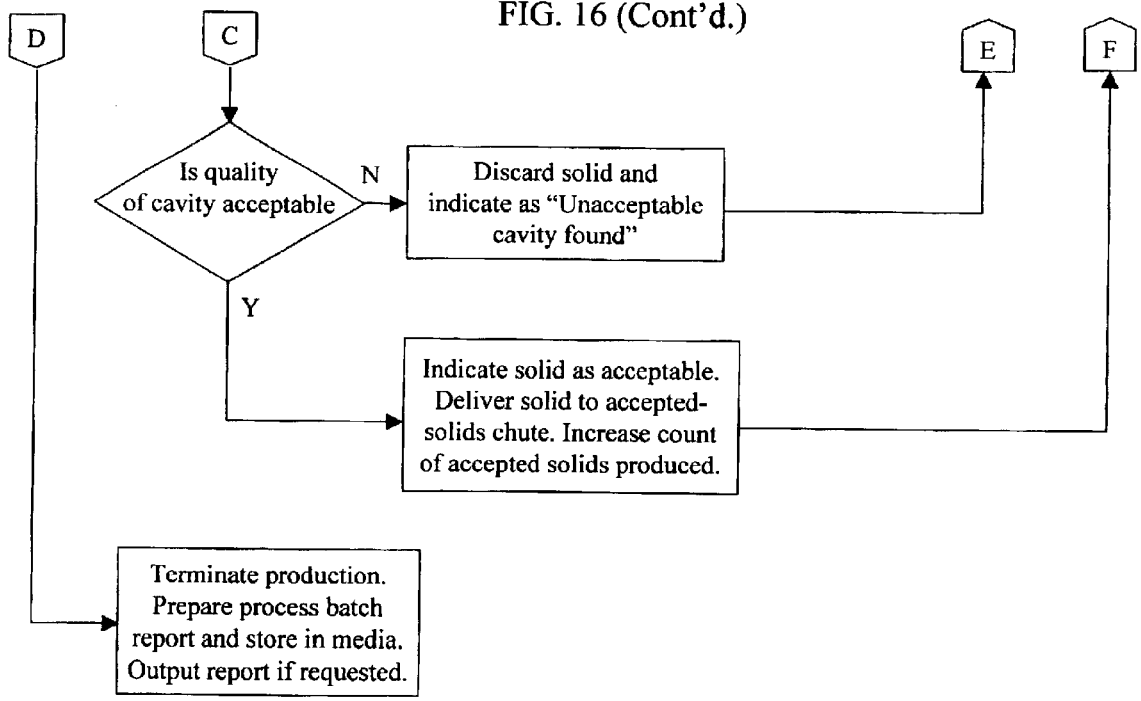

When the inspection system employing an inspection camera is used, the logic flow chart in FIG. 16, or one equivalent to it, can be used to integrate the process validation system with the control system. At the beginning of operation, all components are actuated and checked for readiness. The components are located in their desired slot-offset positions and are aligned with their respective slots. The synchronizer then determines the indexer speed and the components are then synchronized. The control system awaits a signal confirming that the components are synchronized. Once synchronized, the inspection camera captures an electronic image of a solid in a slot in the inspection zone. An analyzer analyzes the electronic image and compares it to reference images. If the captured image matches the background reference image (image of slot with no solids present), a signal that an empty slot was detected is generated and the system awaits the next synchronization signal. If the captured image does not match the background reference image, the analyzer compares the captured image to the "color" reference standard image (image of a correctly colored solid). If the captured image does not match the reference standard image, the analyzer will determine whether or not the production process is a "bicolor process", i.e., a process wherein solids having two differently colored faces are being drilled. Then, if the process is not a bicolor process, the analyzer will determine whether or not a cavity has been drilled in the solid. If not, the analyzer will indicate the solid as "undrilled solid with wrong color", for example, and send a signal to discard the solid into the rejected solids chute. If so, the analyzer will indicate the solid as "drilled solid with wrong color", for example, and send a signal to discard the solid into the rejected solids chute. If the process is a bicolor process, the analyzer will indicate the solid as "wrong colored solid", for example, and send a signal to discard the solid.

If the captured image matches the color reference standard image, the analyzer determines whether or not a cavity was drilled in the solid by comparing the captured image to a "drilled solid" reference standard image (image of a correctly colored and drilled solid). If the captured image does not match the drilled solid reference standard image, the analyzer will indicate the solid as "undrilled solid", for example, and generate a signal to discard the solid. If the captured image matches the drilled solid reference standard image, the analyzer will determine whether or not the cavity is of acceptable quality. If not, the analyzer will indicate the solid as "solid with unacceptable cavity", for example, and send a signal to discard the solid. If so, the analyzer will indicate the solid as "correctly drilled and colored solid", for example, and send a signal to direct the solid to the accepted-solids chute. At any point in the process, the operation can be terminated by an operator. Each time a solid is discarded, the count of rejected solids will be incremented by one. Likewise, each time a solid is finally accepted, the count of accepted solids will be incremented by one. After receiving a signal to discard or accept a solid, the control system will await a synchronization signal.

Since the equipment is optionally equipped with an automated solids-loading chute and an automated solids-diverging means, the laser drilling system can be operated continuously. Alternatively, the system can be operated batchwise wherein the solids reservoir is loaded with a fixed amount of solids that are loaded, drilled and delivered prior to recharging of the solids reservoir. The system can also be operated semi-continuously by either loading or delivering solids in a batchwise manner while delivering or loading, respectively, solids in a continuous manner.

While the continuous solids indexer exemplified herein comprises a single rotary member comprising a fixed number of plural solids-receiving slots or receptacles, a continuous solids indexer can comprise plural such indexers that are either rotary or comprised of a multi-slotted belt or chain.

As used herein, the term "responsive to a signal" means that a component will perform an action or process step in response to a direct or indirect signal received from another component.

As used herein the term, "in synchronization with" means that operation of the component being referred to is synchronized with operation of another predetermined component (generally the synchronization means) of the laser drilling system. When synchronized, the components of the laser drilling system will perform their specified operations at specified slots depending upon the conditions present in the specified slots. The synchronization means generally comprises an optical sensor that detects the slots as they pass by. The synchronization means also determines the speed of indexer. The scanner driving ramp, shift register clock, laser pulse start and inspection system software will generally synchronize with the synchronization signal generated by the synchronization means.

The electronic inspection system of the invention is a "process validation means" since it validates performance of the laser drilling system or one or more of the individual components comprising the laser drilling system. As such, the process validate system can generate an electronic, stored, displayed and/or printed report viewable by an operator. The process validation report contains information concerning operation, the number of rejected solids, number of accepted solids, and the bases upon which the solids were rejected, for example.

Figure 18:
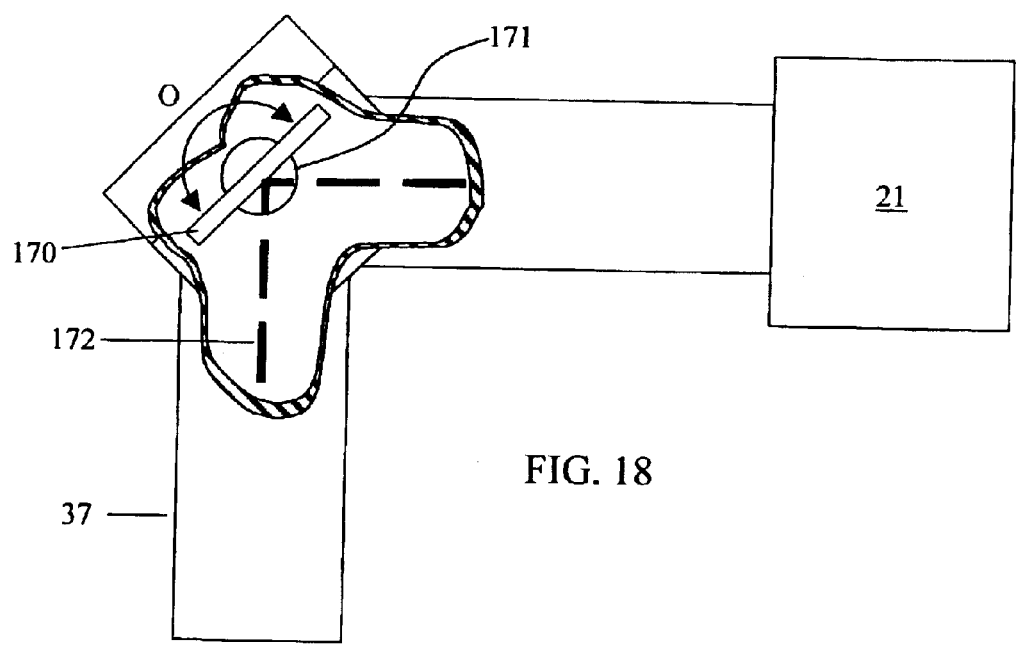
FIG. 18 depicts a partial sectional front view of part of the laser drilling system.

FIG. 18 depicts a partial sectional front elevation of the conduits and oscillating mirror assembly of the laser drilling system. The laser drilling device (21) emits a laser pulse (172) within a first conduit in the direction of an oscillating mirror (170) that is oscillated along the arrow (O) by a scanner motor (171). The laser pulse reflects off the mirror into a second conduit toward the shroud (37) and the firing zone (153, FIG. 17). During the firing of a laser pulse, the mirror tilts such that the laser beam goes from a first position (172a, FIG. 11) to a second position (172b, FIG. 11). In effect, the laser beam in synchronization with the slots of the indexer (preferably in synchronization with the radial and angular centers of the slots), tracks movement of the slots and their respective solids. After a pulse is fired, the mirror tilts back to its starting position in preparation for receiving another pulse. The forward and backward tilting of the mirror is considered a single cycle. When the laser drilling device and the oscillating mirror are synchronized with the indexer, second rejection means, solids detector and synchronization means, one oscillation cycle of the mirror occurs for each slot and/or solid that passes through the firing zone. Therefore, an indexer speed of 30 slots per second corresponds with an oscillating mirror rate of 30 oscillation cycles per second.

The examples herein should not be considered exhaustive, but merely illustrative of only a few of the many embodiments contemplated by the present invention. The methods described herein can be followed to prepare and operate a laser drilling system according to the invention.

The above is a detailed description of particular embodiments of the invention. It is recognized that departures from the disclosed embodiments may be made within the scope of the invention and that obvious modifications will occur to a person skilled in the art. Those of skill in the art should, in light of the present disclosure, appreciate that many changes can be made in the specific embodiments which are disclosed herein and still obtain a like or similar result without departing from the spirit and scope of the invention. All of the embodiments disclosed and claimed herein can be made and executed without undue experimentation in light of the present disclosure.

What is claimed is:

1. A laser drilling system comprising:
    a) a laser device that directs a pulsing laser beam at a firing zone;
    b) a solids handling assembly comprising:
        c) a first solids reservoir;
        d) a continuous solids indexer comprising plural solids-receiving slots;
        e) a containment assembly comprising an undrilled-solids loading zone and a drilled-solids delivery zone; and
        f) a first rejection device, between the firing zone and the delivery zone, that directs undrilled solids back to the solids reservoir;
    wherein the indexer transports a solid from the reservoir through the firing zone to a delivery zone, and the laser device, in synchronization with the solids indexer, drills one or more holes or cavities in the surface of the solid.

2. The laser drilling system of claim 1 further comprising:
    a) a second solids rejection device between the solids reservoir and the firing zone; and
    b) a solids-repositioning device between the solids reservoir and the firing zone.

3. The laser drilling system of claim 1 further comprising:
    a) an electronic inspection device directed at an inspection zone between the firing zone and the delivery zone, wherein the electronic inspection device determines the presence of a hole or cavity, the location of a hole or cavity, the number of holes or cavities and/or the shape of a hole or cavity drilled in the surface of the solid and/or determines the color of the solid; and
    b) a solids-diverging means in the delivery zone and responsive to a signal from the inspection device, wherein the solids-diverging means directs accepted solids to an accepted-solids zone and rejected solids to a rejected-solids zone.

4. The laser drilling system of claim 3 further comprising:
    a) a second solids rejection device between the solids reservoir and the firing zone; and
    b) a solids-repositioning device between the solids reservoir and the firing zone.

5. The laser drilling system of claim 1 or 3 further comprising:
    a) a solids detector in a first detection zone between the loading zone and the firing zone;
    wherein:
        the indexer transports a solid from the solids reservoir through a first detection zone and then the firing zone to a delivery zone, and the laser device, in synchronization with the solids indexer and the solids detector, drills one or more holes or cavities in the surface of the solid; and
        the solids detector detects the presence of a solid in a solids receiving slot of the indexer by means other than the pulsing laser beam of the laser device.

6. The laser drilling system of claim 5 further comprising:
    a) a color detector in the first detection zone to detect the color of the surface of a solid in a solids receiving slot;
    wherein the color detector operates in synchronization with the laser device.

7. The laser drilling system of claim 6 further comprising:
    a) a second solids rejection device between the solids reservoir and the firing zone; and
    b) a solids-repositioning device between the solids reservoir and the firing zone.

8. The laser drilling system of claim 1 or 3, wherein:
    a) the first solids reservoir further comprises a fill detector; and
    b) the system further comprises a solids-loading means adapted to conduct solids from a second solids reservoir into the first solids reservoir; wherein the solids-loading means comprises a flow controller responsive to a signal from the fill detector.

9. The laser drilling system of claim 8 further comprising:
    a) a second solids rejection device between the solids reservoir and the firing zone; and
    b) a solids-repositioning device between the solids reservoir and the firing zone.

10. The laser drilling system of claim 5, wherein:
    a) the first solids reservoir further comprises a fill detector; and
    b) the system further comprises a solids-loading means adapted to conduct solids from a second solids reservoir into the first solids reservoir; wherein the solids-loading means comprises a flow controller responsive to a signal from the fill detector.

11. A laser-drilling system comprising:
    a) a laser device that directs a pulsing laser beam at a firing zone;
    b) a solids handling assembly comprising:
        c) a first solids reservoir;
        d) a continuous solids indexer comprising plural solids-receiving slots;

e) a containment assembly comprising an undrilled-solids loading zone and a drilled-solids delivery zone;

f) an electronic inspection device directed at an inspection zone between the firing zone and the delivery zone; and g) a solids-diverging means in the delivery zone and responsive to a signal from the inspection device;

wherein:

the indexer transports a solid from the solids reservoir through the firing zone to a delivery zone, and the laser device, in synchronization with the solids indexer, drills one or more holes or cavities in the surface of the solid; and the electronic inspection device determines the presence of a hole or cavity, the location of a hole or cavity, the number of holes or cavities and/or the shape of a hole or cavity drilled in the surface of the solid and/or determines the color of the solid.

12. The laser-drilling system of claim 11 further comprising:

a) a solids detector in a first detection zone between the loading zone and the firing zone;

wherein the indexer transports a solid from the solids reservoir through a first detection zone and then the firing zone to a delivery zone, and the laser device, in synchronization with the solids indexer and the solids detector, drills one or more holes or cavities in the surface of the solid.

13. The laser-drilling system of claim 11 or 12 further comprising a) a color detector in the first detection zone to detect the color of the surface of a solid in a solids receiving slot;

wherein the color detector operates in synchronization with the laser device.

14. The laser-drilling system of claim 13, wherein:

a) the first solids reservoir further comprises a fill detector; and b) the system further comprises a solids-loading means adapted to conduct solids from a second solids reservoir into the first solids reservoir; wherein the solids-loading means comprises a flow controller responsive to a signal from the fill detector.

15. The laser drilling system of claim 14 further comprising:

a) a second solids rejection device between the solids reservoir and the firing zone; and b) a solids-repositioning device between the solids reservoir and the firing zone.

16. The laser-drilling device of claim 14 further comprising:

a) a first rejection device, between the firing zone and the delivery zone, that directs undrilled solids back to the solids reservoir.

17. The laser drilling system of claim 16 further comprising:

a) a second solids rejection device between the solids reservoir and the firing zone; and b) a solids-repositioning device between the solids reservoir and the firing zone.

18. A laser-drilling system comprising:

a) a laser device that directs a pulsing laser beam at a firing zone;

b) a solids handling assembly comprising:

c) a first solids reservoir;

d) a continuous solids indexer comprising plural solids-receiving slots;

e) a containment assembly comprising an undrilled-solids loading zone and a drilled-solids delivery zone;

f) a solids detector in a first detection zone between the loading zone and the firing zone; and g) a color detector in the first detection zone to detect the color of the surface of a solid in a solids receiving slot;

wherein:

the indexer transports a solid from the solids reservoir through a first detection zone and then the firing zone to a delivery zone, and the laser device, in synchronization with the solids indexer and the solids detector, drills one or more holes or cavities in the surface of the solid; and the solids detector detects the presence of a solid in a solids receiving slot of the indexer by means other than the pulsing laser beam of the laser device.

19. The laser-drilling system of claim 18, wherein:

a) the first solids reservoir further comprises a fill detector; and b) the system further comprises a solids-loading means adapted to conduct solids from a second solids reservoir into the first solids reservoir; wherein the solids-loading means comprises a flow controller responsive to a signal from the fill detector.

20. The laser drilling system of claim 18 further comprising:

a) a second solids rejection device between the solids reservoir and the firing zone; and b) a solids-repositioning device between the solids reservoir and the firing zone.

21. The laser-drilling system of claim 18 further comprising:

a) a first rejection device, between the firing zone and the delivery zone, that directs undrilled solids back to the solids reservoir.

22. The laser drilling system of claim 21 further comprising:

a) a second solids rejection device between the solids reservoir and the firing zone; and b) a solids-repositioning device between the solids reservoir and the firing zone.

23. A laser drilling system comprising:

a) a laser device that directs a pulsing laser beam at a firing zone;

b) a solids handling assembly comprising:

c) a continuous solids indexer comprising plural solids-receiving slots;

d) a first solids reservoir comprising a fill detector;

e) a solids-loading means adapted to conduct solids from a second solids reservoir into the first solids reservoir; wherein the solids-loading means comprises a flow controller responsive to a signal from the fill detector; and f) a solids delivery zone, wherein the indexer transports a solid from the solids reservoir through the firing zone to a delivery zone, and the laser device, in synchronization with the solids indexer, drills one or more holes or cavities in the surface of the solid.

24. The laser drilling system of claim 23 further comprising:

a) an electronic inspection device directed at an inspection zone between the firing zone and the delivery zone, wherein the electronic inspection device determines the presence of a hole or cavity, the location of a hole or cavity, the number of holes or cavities and/or the shape of a hole or cavity drilled in the surface of the solid and/or determines the color of the solid; and b) a solids-diverging means in the delivery zone and responsive to a signal from the inspection device, wherein the solids-diverging means directs accepted solids to an accepted-solids zone and rejected solids to a rejected-solids zone.

25. The laser drilling system of claim 1–3, 11–12, 18–23 or 24 further comprising:

a) a synchronizer that generates a synchronization signal used to synchronize operation of multiple components of the laser apparatus, wherein the components are synchronized by way of a slot offset.

26. The laser drilling system of claim 3, 11, or 24, wherein the electronic inspection device further comprises:

a) a monitor for displaying electronic images captured by the electronic inspection device.

27. The laser drilling system of claim 26 further comprising:

a) one or more computers that control a portion of the operation of the laser drilling system such that operation of the system is computer and operator controlled.

28. The laser drilling system of claim 1, 3, 11–12, 18, 20, 23, or 24 comprising redundant detection means, wherein a first of the redundant detection means is disposed between the firing zone and the solids reservoir and the second of the redundant detection means is disposed between the firing zone and the solids delivery zone.

29. A method of drilling a hole or cavity with a laser into a solid, the method comprising the steps of:

a) providing plural solids in a continuous solids indexer which obtains the solids from a solids reservoir;

b) striking a solid in the slot of the solids indexer with one or more laser pulses as the solids indexer passes it through a firing zone to form one or more holes, cavities or a combination thereof on the surface of the solid;

c) rejecting the solid if no hole or cavity is formed on the solid to provide a rejected solid, wherein the rejected solid, if present, is returned to the solids reservoir;

d) delivering a drilled solid to a delivery zone;

e) directing a correctly drilled solid to an acceptance zone and directing an incorrectly drilled or an undrilled solid to a rejection zone.

30. The method of claim 29, wherein step a) further comprises the step of loading solids into the solids reservoir in response to a direct or indirect signal generated by a fill detector.

31. The method of claim 29 further comprising the following step which occurs between steps a) and b):

a1) first rejecting and/or repositioning an incorrectly positioned solid in the solids indexer, wherein a first rejected solid, if formed, is returned to the solids reservoir.

32. The method of claim 31, wherein the steps of first rejecting and second rejecting comprise the step of directing a pulse or stream of pressurized air toward the solid.

33. The method of claim 29 or 31 further comprising the following step which occurs between steps a) and b):

a2) detecting the presence and/or color of the solid in the solids indexer.

34. The method of claim 33 further comprising the following step which occurs between steps d) and e):

d1) inspecting the solid to determine the presence of a hole or cavity, the location of a hole or cavity, the number of holes or cavities and/or the shape of a hole or cavity drilled in the surface of the solid and/or determine the color of the solid;

wherein step e) comprises:

e) directing a correctly drilled, and correctly colored, solid to an acceptance zone and directing a incorrectly drilled, incorrectly colored solid, correctly drilled and incorrectly colored solid, or incorrectly drilled and correctly colored solid to a rejection zone.

35. The method of claim 34, wherein step d1) further comprises the step of capturing an electronic image of the solid and analyzing the captured image by comparing it to one or more reference images.

36. The method of claim 29 or 31 further comprising the following step which occurs between steps d) and e):

d1) inspecting the solid to determine the presence of a hole or cavity, the location of a hole or cavity, the number of holes or cavities and/or the shape of a hole or cavity drilled in the surface of the solid and/or determine the color of the solid;

wherein step e) comprises:

e) directing a correctly drilled, and correctly colored, solid to an acceptance zone and directing a incorrectly drilled, incorrectly colored solid, correctly drilled and incorrectly colored solid, or incorrectly drilled and correctly colored solid to a rejection zone.

37. The method of claim 36, wherein step d1) further comprises the step of capturing an electronic image of the solid and analyzing the captured image by comparing it to one or more reference images.

* * * * *